US008903635B2

(12) United States Patent
Kim et al.

(10) Patent No.: US 8,903,635 B2
(45) Date of Patent: Dec. 2, 2014

(54) PROVIDING AND USING OF INFORMATION ON VIDEO RELATED TO TRAFFIC SITUATION

(75) Inventors: Youngin Kim, Seoul (KR); Chuhyun Seo, Seoul (KR); Sango Park, Seoul (KR)

(73) Assignee: LG Electronics Inc., Seoul (KR)

( * ) Notice: Subject to any disclaimer, the term of this patent is extended or adjusted under 35 U.S.C. 154(b) by 1049 days.

(21) Appl. No.: 12/450,607

(22) PCT Filed: Apr. 10, 2008

(86) PCT No.: PCT/KR2008/002003
§ 371 (c)(1), (2), (4) Date: Oct. 2, 2009

(87) PCT Pub. No.: WO2008/123747
PCT Pub. Date: Oct. 16, 2008

(65) Prior Publication Data

US 2010/0114465 A1 May 6, 2010

Related U.S. Application Data

(60) Provisional application No. 60/910,709, filed on Apr. 9, 2007.

(51) Int. Cl.

| | |
|---|---|
| ***G08G 1/00*** | (2006.01) |
| ***H04H 20/55*** | (2008.01) |
| ***H04N 7/18*** | (2006.01) |
| ***G08G 1/09*** | (2006.01) |

(52) U.S. Cl.
CPC ............... *H04H 20/55* (2013.01); *G08G 1/092* (2013.01)
USPC ............ 701/117; 370/464; 370/471; 348/149

(58) Field of Classification Search
USPC .............. 701/117; 375/242, 240.27; 370/474, 370/464, 476, 471; 348/149; 709/204
IPC ............... H04N 7/26; G08G 1/00; H04H 20/55
See application file for complete search history.

(56) References Cited

U.S. PATENT DOCUMENTS 6,021,433 A * 2/2000 Payne et al. .................. 709/219
6,144,676 A * 11/2000 Hamalainen et al. ......... 370/528
(Continued)

FOREIGN PATENT DOCUMENTS

EP 1445750 8/2004
JP 2000-046569 2/2000
(Continued)

OTHER PUBLICATIONS

Jeong et al.: "A Novel TSI application based on TPEG using T-DMB", Consumer Electronics, 2007. ICCE 2007, Digest of Technical Papers, Jan. 1, 2007, pp. 1-2, XP031071429.
(Continued)

*Primary Examiner* — Tuan C. To

(74) *Attorney, Agent, or Firm* — McKenna Long & Aldridge LLP

(57) ABSTRACT

Encoding and decoding of application information is disclosed. An encoding method includes creates multimedia object information on video and/or audio data related to content carried by a traffic information message provided through traffic information service, creates reference information indicating the traffic information message, and organizes a multimedia information message that includes the multimedia object information and the reference information. While using a traffic information provided by a traffic information service, a user can, if necessary, recognize visually and/or audially a special traffic situation of which information is provided by a traffic information service.

6 Claims, 25 Drawing Sheets

(56) References Cited

U.S. PATENT DOCUMENTS

| | | | | |
|---|---|---|---|---|
| 6,272,190 | B1 * | 8/2001 | Campana, Jr. | 375/347 |
| 6,650,948 | B1 * | 11/2003 | Atkinson et al. | 700/66 |
| 7,035,914 | B1 * | 4/2006 | Payne et al. | 709/219 |
| 7,454,457 | B1 * | 11/2008 | Lowery et al. | 709/203 |
| 7,486,701 | B2 * | 2/2009 | Friel | 370/493 |
| 7,593,380 | B1 * | 9/2009 | Ferguson et al. | 370/342 |
| 7,672,660 | B2 * | 3/2010 | Kim et al. | 455/343.1 |
| 7,689,249 | B2 * | 3/2010 | Silverbrook et al. | 455/557 |
| 7,692,948 | B2 * | 4/2010 | Shiga et al. | 365/145 |
| 7,698,055 | B2 * | 4/2010 | Horvitz et al. | 701/117 |
| 7,810,089 | B2 * | 10/2010 | Sundarrajan et al. | 717/174 |
| 7,912,471 | B2 * | 3/2011 | Kodikara Patabandi et al. | 455/450 |
| 7,930,095 | B2 * | 4/2011 | Lee | 701/119 |
| 7,953,457 | B2 * | 5/2011 | Salomone et al. | 455/574 |
| 7,953,871 | B2 * | 5/2011 | Kuz et al. | 709/229 |
| 7,974,202 | B2 * | 7/2011 | Solomon | 370/235 |
| 8,027,369 | B2 * | 9/2011 | Kim et al. | 370/532 |
| 8,046,162 | B2 * | 10/2011 | Nonaka | 701/423 |
| 8,079,037 | B2 * | 12/2011 | Lui et al. | 719/310 |
| 8,185,591 | B1 * | 5/2012 | Lewis | 709/206 |
| 2001/0043584 | A1 | 11/2001 | Kersken et al. | |
| 2006/0195605 | A1 * | 8/2006 | Sundarrajan et al. | 709/232 |
| 2006/0259644 | A1 * | 11/2006 | Boyd et al. | 709/250 |
| 2007/0028001 | A1 * | 2/2007 | Phillips et al. | 709/238 |
| 2007/0189181 | A1 * | 8/2007 | Kirk et al. | 370/252 |
| 2007/0206561 | A1 * | 9/2007 | Son et al. | 370/346 |
| 2007/0217370 | A1 * | 9/2007 | Soong et al. | 370/337 |
| 2007/0218939 | A1 * | 9/2007 | Lim et al. | 455/528 |
| 2007/0239822 | A1 * | 10/2007 | Tuttle et al. | 709/203 |
| 2007/0248067 | A1 * | 10/2007 | Banerjea et al. | 370/338 |
| 2007/0253421 | A1 * | 11/2007 | Cai | 370/394 |
| 2007/0276901 | A1 * | 11/2007 | Glinsky et al. | 709/203 |
| 2007/0298804 | A1 * | 12/2007 | Tamura et al. | 455/437 |
| 2008/0165769 | A1 * | 7/2008 | Aldaz et al. | 370/389 |

FOREIGN PATENT DOCUMENTS

| | | |
|---|---|---|
| KR | 10-1998-0065027 | 10/1998 |
| KR | 10-2005-0008389 | 1/2005 |
| KR | 10-2006-0110490 | 10/2006 |
| WO | WO 02/13161 | 2/2002 |

OTHER PUBLICATIONS

CEN: Traffic and Travel Information (TTI)—TTI via Transport Protocol Expert Group (TPEG) data streams—Part 4: Road Traffic Message (RTM) application (TPEG-RTM_3.0/003), Jan. 11, 2005, XP-002656241.

Traffic and Travel Information (TTI)—TTI via Transport Protocol Expert Group (TPEG) data streams—Part 5: Public Transport Information (PTI) application. Jun. 1, 2006, XP002656242.

Traffic and Travel Information (TTI)—TTI via Transport Protocol Expert Group (TPEG) data streams—Part 3: Service and Network Information (SNI) application, Jun. 1, 2006, XP009087763.

* cited by examiner

FIG. 2B

```
<road_traffic_message>£°=
<intunli>(mid),                    :°Message identifier
<intunti>(ver),                    :°Version number
<intunli>                          :°Length, n, of message in bytes
<bitswitch>(selector),             :°Message element
if(selector=xxxxxxx1)<time_t>,     :°Message creation time
if(selector=xxxxxx1x)<time_t>,     :° Start time
if(selector=xxxxx1xx)<time_t>,     :°End time
if(selector=xxxx1xxx)<time_t>,          : Message expiry time
if(selector=xxx1xxxx)<intunlo>,    : Cause of problem, TPEG rtm46
if(selector=xx1xxxxx)<intunlo>,    £°Cross Reference Information
if(selector=x1xxxxxx)<intunlo>,    : Unidentified information, TPEG rtm46
if(selector=1xxxxxxx)<mbt_components>, :Road traffic message components
```

FIG. 3A

```
<rtm_component(80)>:=       : Accident event class
<intunti>(id),              £°Identifier, id£½80 hex
<intunli>(n),               £°Length, n, of component data in bytes
<intunti>(id),              £°Number of accidents
m*<accident_component()>;      £°Accident components
```

FIG. 3B

```
<accident_component(00)>:=       :Position of accident component
<intunti>(id),              £°Identifier, id£½00 hex
<intunli>(n),               £°Length, n, of component data in bytes
<rtm10>,                    £°Location of accident, TPEG rtm10
```

FIG. 3C

```
<accident_component(01)>:=       :Animal component
<intunti>(id),              £°Identifier, id£½01 hex
<intunli>(n),               £°Length, n, of component data in bytes
<numag>,                    £°Number of animals
m*<animal_component()>;£°Animal components
```

FIG. 3D

```
<accident_component(02)>:=        :Vehicle component
<intunti>(id),                    £"Identifier, id£½02 hex
<intunli>(n),                     £"Length, n, of component data in bytes
<numag>,                           :Number of vehicles
m*<vehicle_component()     : Vehicle components
```

FIG. 3E

```
<accident_component(03)>:=        :People component
<intunti>(id),                    £"Identifier, id£½03 hex
<intunli>(n),                     £"Length, n, of component data in bytes
<numag>,                           : Number of people
m*<people_component()      :  People components
```

FIG. 4

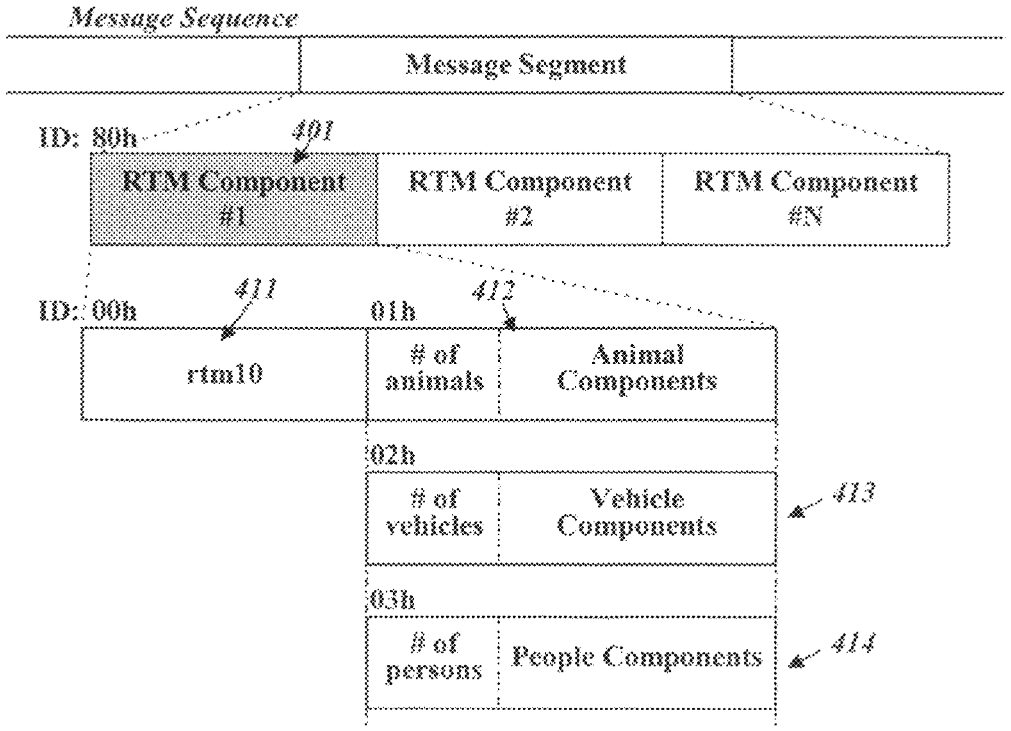

FIG. 5
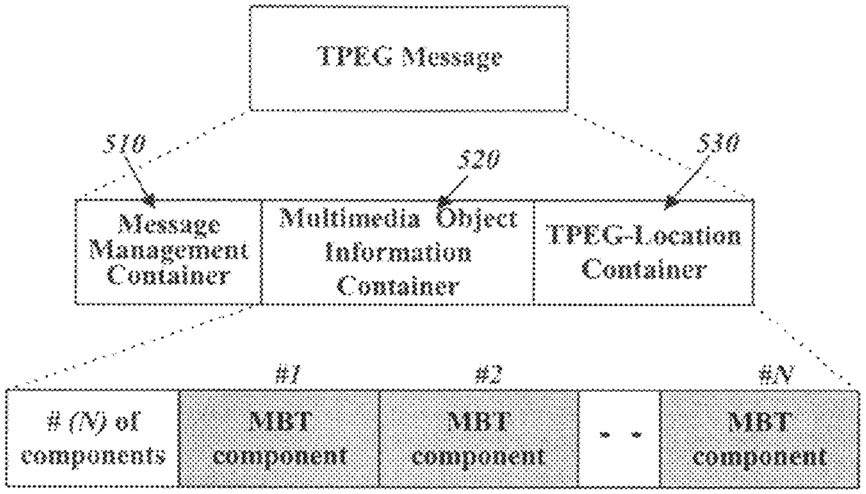
FIG. 6A
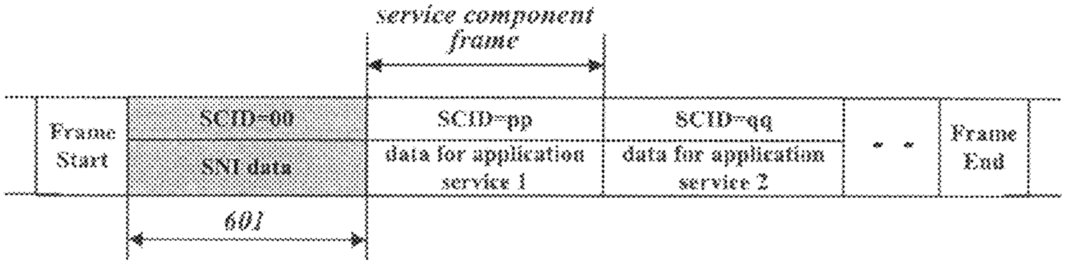
FIG. 6B
```
<service_component_frame>:=   :Service and Network Information Application
<intunti>(scid),              : Service Component Identifier (scid = 00)
<crc>,                        : CRC, as defined in TPEG-SSF
                              : Component Data
<intunti>(n),                 : Number of components
n * <sni_component()>,        : SNI component
<crc>;                        : SNI component CRC
```

FIG. 6C

| | |
|---|---|
| <sni_component(01)>:= | : Guide to service Table 1 |
| <intunti>(id), | : Identifier, id=01 hex |
| <intunli>(n), | : Length, n, of component data in bytes |
| <intunti>, | : Table incremental version number |
| <chartab>, | : Character Table identifier |
| m*<line_of_table_1>; | : All, m, lines of the Guide to Service Table 1 |

610

| | |
|---|---|
| <line_of_table_1>:= | : One line of Guide to the Service Table 1 |
| <intunti>, | : Service Component ID (SCID) |
| <bit_switch>(selector), | : Component elements supplied |
| | : Application and Content ID (ACID) |
| if (selector = xxxxxxx1) | : present only, when different from Carrier ServiceID |
| [ | |
| <intunti>, | : Originator Service ID-A |
| <intunti>, | : Originator Service ID-B |
| <intunti>, | : Originator Service ID-C |
| ] | |
| <intunti>, | : Content ID (COID) |
| <intunli>, | : Application ID (AID) |
| if (selector = xxxxx1xx) <optime>, | : Operating Time |
| if (selector = xxxx1xxx) <intunti>, | : Encryption Indicator |
| if (selector = xxx1xxxx) <>; | : Safety flag is set |

612

611

FIG. 9

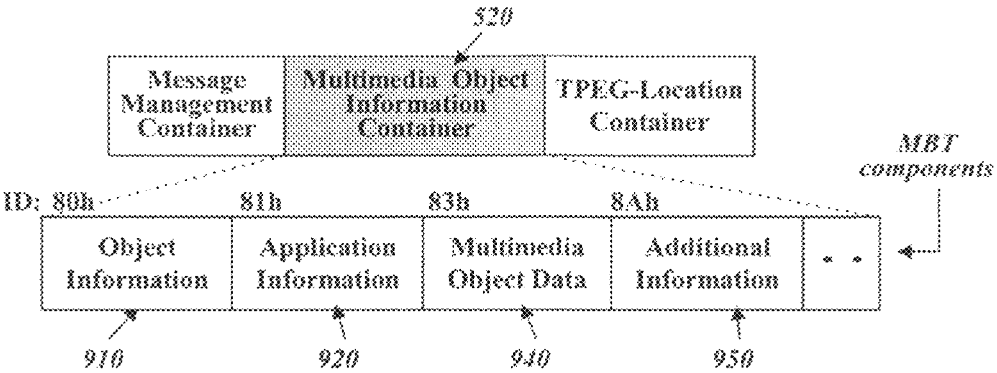

FIG. 10A

```
<mbt_component(80)>:=      £°Object information
  <intunti>(id),           £°Identifier, id£½80 hex
  <intunli>(n),            £°Length, n, of component data in bytes
  m*<object_component()>;£°Object components
```

FIG. 10B

```
<object_component(00)>:= £°Play classification
<intunti>(id),           £°Identifier,  id£½00 hex
<intunti>(n),            £°Length, n, of component data in bytes
<mbt01>;                 £°Play type
```

FIG. 10C

```
<object_component(01)>:= £°Object classification
<intunti>(id),           £°Identifier,  id£½01 hex
<intunti>(n),            £°Length, n, of component data in bytes
m*<object_format_component()>;£°Object type
```

FIG. 10D

```
<object_format_component(00)>:=     £°Object type_video component
<intunti>(id),                      £°Identifier, id£½00 hex
<intunti>(n),                       £°Length, n, of component data in bytes
<mbt02>;                            £°Video object type
```

FIG. 10E

```
<object_format_component(01)>:=     £°Object type_audio component
<intunti>(id),                      £°Identifier, id£½01 hex
<intunti>(n),                       £°Length, n, of component data in bytes
<mbt03>;                            £°Audio object type
```

FIG. 10F

```
<object_format_component(02)>:=     £°Object type_image component
<intunti>(id),                      £°Identifier, id£½02 hex
<intunti>(n),                       £°Length, n, of component data in bytes
<mbt04>;                             : Image object type
```

FIG. 10G

```
<object_component(02)>:=£°Object size
<intunti>(id),                      £°Identifier, id£½02 hex
<intunti>(n),                       £°Length, n, of component data in bytes
<intunlo>;                          £°Object size ( 0 - 4,294,967,296 byte)
```

FIG. 10H

```
<object_component(03)>:=: Compression information
<intunti>(id),                      £°Identifier, id£½02 hex
<intunti>(n),                       £°Length, n, of component data in bytes
<mbt05>;                            £°Compression information
```

FIG. 12A

<mbt_component(81)>:= £°Information type
<intunti>(id), £°Identifier, id£½81 hex
<intunli>(n), £°Length, n, of component data in bytes
m*<application_information_component()>;£°Application information components

FIG. 12B

<application_information_component(00)>:=:Information Id component
<intunti>(id), £°Identifier, id£½00 hex
<intunti>(n), £°Length, n, of component data in bytes
<mbt06>; £°Information type

FIG. 12C

<application_information_component(01)>:= £°Collector component
<intunti>(id), £°Identifier, id£½01 hex
<intunti>(n), £°Length, n, of component data in bytes
<mbt07>; : Collector

FIG. 12D

<application_information_component(02)>:=: Content description omponent
<intunti>(id), £°Identifier, id£½02 hex
<intunti>(n), £°Length, n, of component data in bytes
<mbt08>, £°Language code
<short_string>; £°Content description

FIG. 13

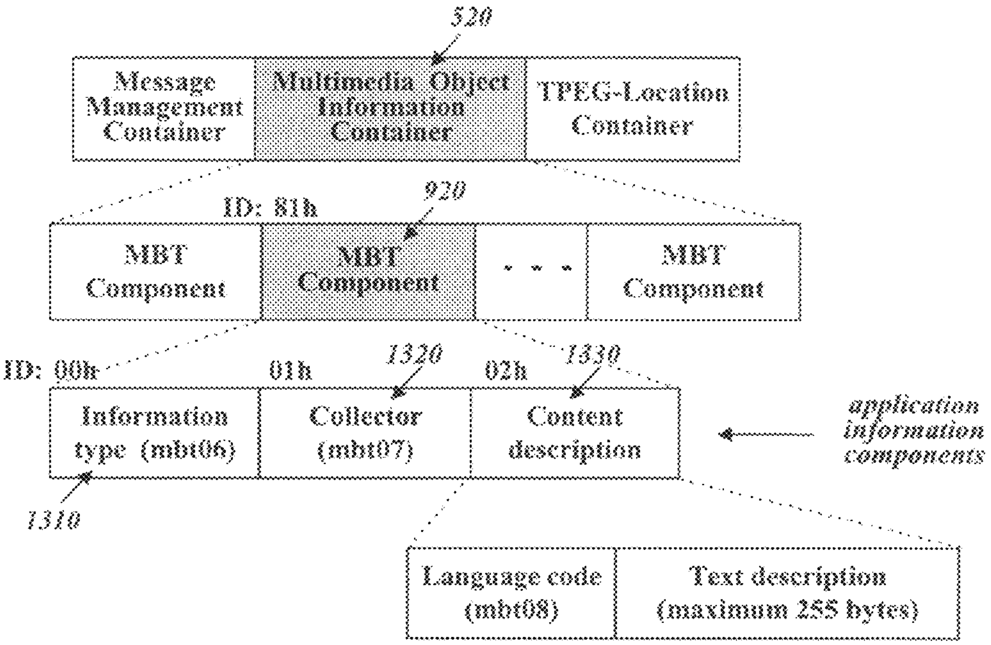

FIG. 14A

```
<mbt_component(83)>:=        £°Multimedia object data
<intunti>(id),               £°Identifier, id£½83 hex
<intunlo>(n),                £°Length, n, of component data in bytes
n*<byte>;                     : Data
```

FIG. 14B

```
<mbt_component(83)>:=        £°Multimedia object data
<intunti>(id),               £°Identifier, id£½83 hex
<intunlo>(n),                £°Length, n, of component data in bytes
<intunti>(total_fragments),  £°Number of total fragments
<intunti>(seq_no),           £°Order of current fragment
n*<byte>;                    : Data
```

1401

1402

FIG. 15

<mbt_component(8A)>:= £°Additional information
<intunti>(id), £°Identifier, id£½8A hex
<intunli>(n), £°Length, n, of component data in bytes
<mbt08>, : Language code
<short_string>; : Additional information

FIG. 16

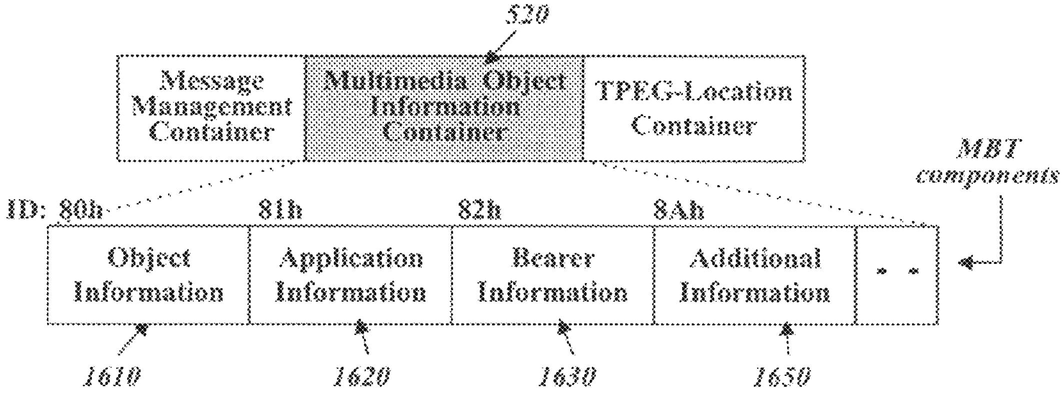

FIG. 17A

<mbt_component(82)>:= £°Transfer medium
<intunti>(id), : Identifier, id£½82 hex
<intunli>(n), £°Length, n, of component data in bytes
m*<bearer_information_component()>;£°Transmission medium component

FIG. 17B

```
<bearer_information_component (00)>:=      £°DMB component
<intunti>(id),                  £°Identifier, id£½00 hex
<intunti>(n),                   £°Length, n, of component data in bytes
<intunti>,                      £°Extended country code (ECC)
<intunli>,                      £°Ensemble identifier (EID)
<dmb_frequency>,                £°Frequency information
     m*<dmb_information_component()>;
```

```
<dmb_frequency>:=            £°DMB frequency
  <center_frequency>,        £°Center frequency definition
```

```
<center_frequency>:=         £°Center frequency definition
  3 * <intunti>;  : 19 bits defined by EN300 401 specifications (from b0 to b18)
                  : b19 to b23 are filled with zeros
                  : Carrier frequency = 0Hz + (center_freq * 16 KHz)
```

FIG. 17C

```
<dmb_information_component(00)>:=        £°sub channel information
<intunti>(id),                  : Identifier, id£½00
<intunti>(n),                   £°Length, n, of component data in bytes
<mbt09>                         £°Transfer channel type classification (MOT/TDC)
<intunli>                       £°sub channel Id
```

FIG. 17D

```
<dmb_information_component(01)>:=£°MOT object link information
<intunti>(id),                  : Identifier, id=01
<intunti>(n),                   £°Length, n, of component data in bytes
<short_string>;                 £°Object file name
```

FIG. 17E

| | |
|---|---|
| <dmb_information_component(02)>:= | £°TDC object link information |
| <intunti>(id), | : Identifier, id£½02 |
| <intunti>(n), | £°Length, n, of component data in bytes |
| <intunli>; | £°Service component Id |

FIG. 17F

| | |
|---|---|
| <bearer_information_component (01)>:= | £°Internet component |
| <intunti>(id), | : Identifier, id£½01 hex |
| <intunli>(n), | £°Length, n, of component data in bytes |
| <long_string>; | : URL defined by RFC1738 |

FIG. 17G

| | |
|---|---|
| <bearer_information_component (02)>:= | £°CDMA component |
| <intunti>(id), | : Identifier, id£½02 hex |
| <intunli>(n), | £°Length, n, of component data in bytes |
| <long_string>; | : URL defined by RFC1738 |

FIG. 17H

| | |
|---|---|
| <bearer_information_component (03)>:= | £°GSM component |
| <intunti>(id), | : Identifier, id£½03 hex |
| <intunli>(n), | £°Length, n, of component data in bytes |
| <long_string>; | : URL defined by RFC1738 |

```
<application_information_component(03)>:=        £"Billing information
<intunti>(id),                    £"Identifier, id£¼03 hex
<intunti>(n),                     £"Length, n, of component data in bytes
m*<billing_information_component()>;£"Billing information
```

FIG. 20

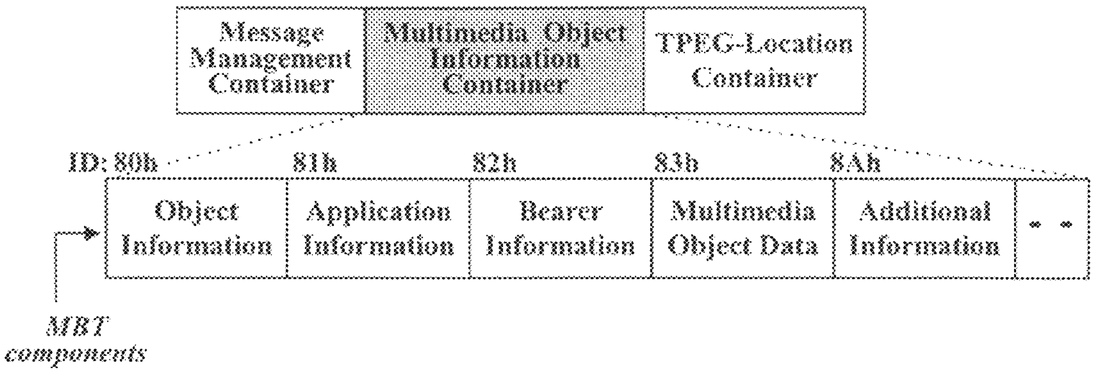

FIG. 21A

```
<mbt_component(85)>:=        £°Cross reference information
<intunti>(id),               £°Identifier, id£½85 hex
<intunli>(n),                £°Length, n, of component data in bytes
<intunti>(k),                £° Number of CRI element components
k*<CRI_element_component()>;£°CRI element components
```

FIG. 21B

```
<CRI_element_component(00)>:=      £°Cross reference information  element
<intunti>(id),               £°Identifier, id£½00 hex
<intunli>(n),                £°Length, n, of component data in bytes
<intunti>(SCID)              £°Service component identifier
<intunti>(Ver)               £°Message version number
<intunli>(MID);              £°Message ID
```

PROVIDING AND USING OF INFORMATION ON VIDEO RELATED TO TRAFFIC SITUATION

This application claims the benefit of PCT/KR2008/002003 filed on Apr. 10, 2008 and U.S. Provisional Application No. 60/910,709 filed on Apr. 9, 2007, both of which are hereby incorporated herein by reference for all purposes in their entirety.

1. TECHNICAL FIELD

The present invention is related to providing information supporting car driving and using the provided information.

2. BACKGROUND ART

Due to recent advances in digital signal processing and communications technology, radio and TV broadcast signals are provided gradually in the form of digital data. As signals are provided in the form of digital data, a variety of information is now allowed to be added to TV or radio broadcast signals, the information including news, stock, weather, traffic, and so on.

In particular, necessity for traffic information is constantly increasing with the increment of the number of vehicles in downtown areas, the number of vehicles during holidays, and so on. Accordingly, methods for providing traffic information as auxiliary information via satellite, terrestrial broadcast, or mobile communications network are under development.

3. DISCLOSURE OF THE INVENTION

One objective of the present invention is to provide a method and an apparatus for helping the user recognize traffic situation by providing visual information about traffic situation.

Another objective of the present invention is to provide a method and an apparatus for providing visual information about traffic situation in association with traffic information provided by another application information service.

Objectives of the present invention are not limited to those described above; those attainable from a specific and illustrative description of the present invention should necessarily be included in the above objective.

One method for encoding application information according to the present invention comprises creating multimedia object information about data with video and/or audio attribute associated with the content carried by a traffic information message provided through a traffic information service, creating reference information specifying the traffic information message, and configuring a multimedia information message comprising the multimedia object information and the reference information.

One method for decoding application information according to the present invention comprises extracting a multimedia information message carrying multimedia object information about data with video and/or audio attribute from signals for a multimedia information service, extracting reference information from the extracted multimedia information message, and extracting traffic information associated with the data with video and/or audio attribute from a traffic information message provided through a traffic information service distinguished from the multimedia information service, the traffic information message being specified by the extracted reference information.

In one embodiment according to the present invention, the reference information comprises a service component identifier assigned for indicating conveyance of information about a particular application service, an identifier about an information message, and a version number of the information message.

In one embodiment according to the present invention, the traffic information message also comprises and transfers a service component identifier assigned for indicating conveyance of information about the multimedia information service, an identifier about the multimedia information message, and a version number of the multimedia information message.

In one embodiment according to the present invention, the reference information consists of a few of reference information sets for referring to multiple traffic information messages.

In one embodiment according to the present invention, the reference information is recorded in an area of management information of the multimedia information message.

In another embodiment according to the present invention, the reference information is recorded in one of components succeeding management information of a multimedia information message.

In one embodiment according to the present invention, the data with video and/or audio attribute are included in the multimedia object information.

In another embodiment according to the present invention, the multimedia object information includes information for accessing the data with video and/or audio attribute transmitted through a signal channel or a transmission medium different from a signal channel or a transmission medium through which the multimedia information message is transmitted. The information for access can include frequency information or unique location information on a network of the data with video and/or audio attribute, e.g., URL (Universal Resource Locator). In case the information for access includes frequency information, the information for access can further include information about a transfer method used for the data with video and/or audio attribute.

In one embodiment according to the present invention, the multimedia object information includes play type, encoding format, size, collector information, or description information of the data with video and/or audio attribute.

In one embodiment according to the present invention, the multimedia object information can include billing information about the data with video and/or audio attribute. In the present embodiment, an acquisition procedure for the data with video and/or audio attribute can be carried out according to the response of the user after providing the billing information for the user. Also, an authentication procedure can be carried out during the acquisition of the data with video and/or audio attribute.

One apparatus for decoding application information according to the present invention comprises a demodulator demodulating received signals and outputting a frame sequence carrying application information, an information decoder adapted for extracting a first information message from one frame from among the frame sequence and extracting from the extracted information message multimedia object information about data with video and/or audio attribute and reference information, a media decoder adapted for decoding the data with video and/or audio attribute, and a controller for controlling the information decoder to decode a second information message associated with the data with video and/or audio attribute, the second information message being specified by the extracted reference information and controlling the media decoder to decode and output the data with video and/or audio attribute included in the multimedia object information.

Another one apparatus for decoding application information according to the present invention comprises a demodulator demodulating received signals and outputting a frame sequence carrying application information, an information decoder adapted for extracting a first information message from one frame from among the frame sequence and extracting from the extracted information message multimedia object information about data with video and/or audio attribute and reference information, a media decoder adapted for decoding the data with video and/or audio attribute, a communication module for carrying out data communication with a network, and a controller for controlling the information decoder to decode a second information message associated with the data with video and/or audio attribute, the second information message being specified by the extracted reference information and after obtaining the data with video and/or audio attribute by controlling the communication module based on information for access included in the multimedia object information, controlling the media decoder to decode and output the obtained data with video and/or audio attribute.

At least one embodiment of the present invention which will be described in detail later with appended drawings enables the user of traffic information to easily recognize multimedia objects related with a current traffic situation visually and/or audially without a complicated procedure, enhancing the convenience of utilizing traffic information and facilitating the use of traffic information.

4. BRIEF DESCRIPTION OF THE DRAWINGS

In the drawings:

FIG. 2B illustrates an example of syntax for organizing message management information of an RTM (Road Traffic Message) message transferring information about traffic situation from application information provided in the transfer format of FIG. 2A;

FIGS. 3A through 3E illustrate respectively syntax for organizing event information transferred being contained in an RTM message;

FIG. 4 illustrates a transfer format of one example of an RTM message organized according to the syntax of FIG. 3A through 3E;

FIG. 5 illustrates a transfer format of an MBT (Multimedia-Based Traffic & Travel) message transferring information about multimedia data related to road traffic information according to an embodiment of the present invention;

FIG. 6A illustrates a structure of a frame carrying various application information and a component frame of service & network information transferred being contained in the frame;

FIG. 6B illustrates syntax showing the structure of a component frame of service & network information of FIG. 6A;

FIG. 6C illustrates syntax showing a structure whereby information about a service table guide is transferred being contained in an SNI component of FIG. 6B;

FIG. 9 illustrates a transfer format of an MBT message organized according to one embodiment of the present invention;

Figure 1:
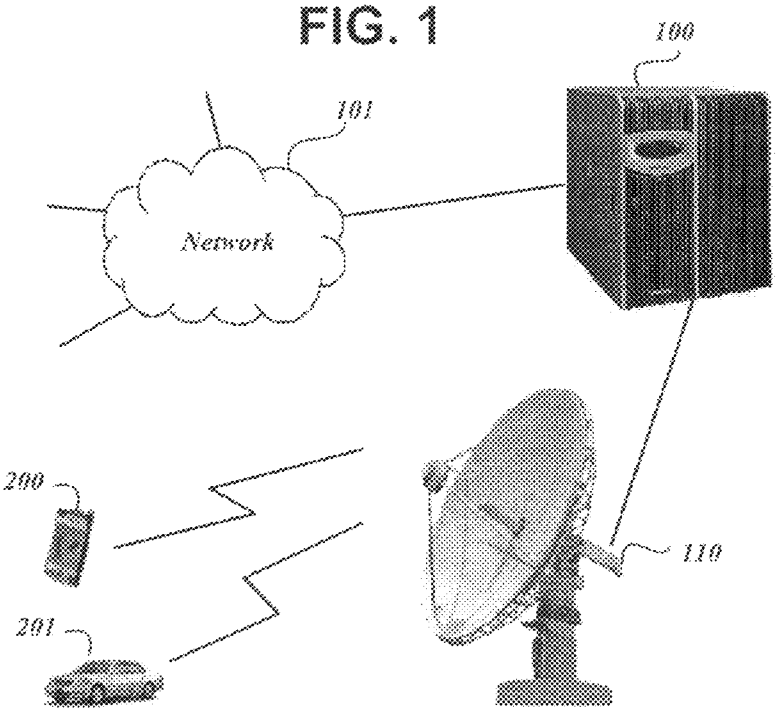
FIG. 1 illustrates a network where a variety of information related to traffic is provided through wireless signals.
Figure 11:
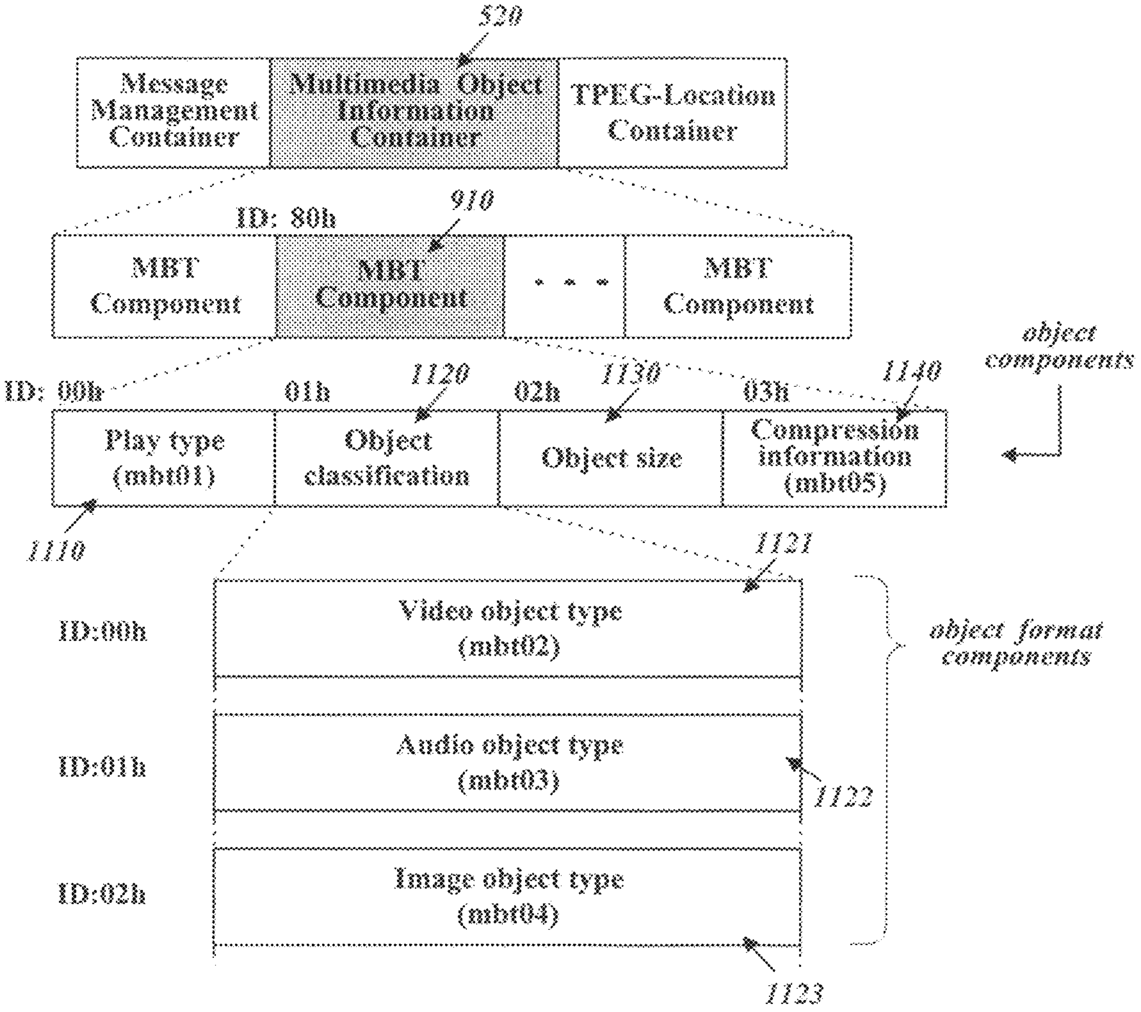
Figures 18, 19:
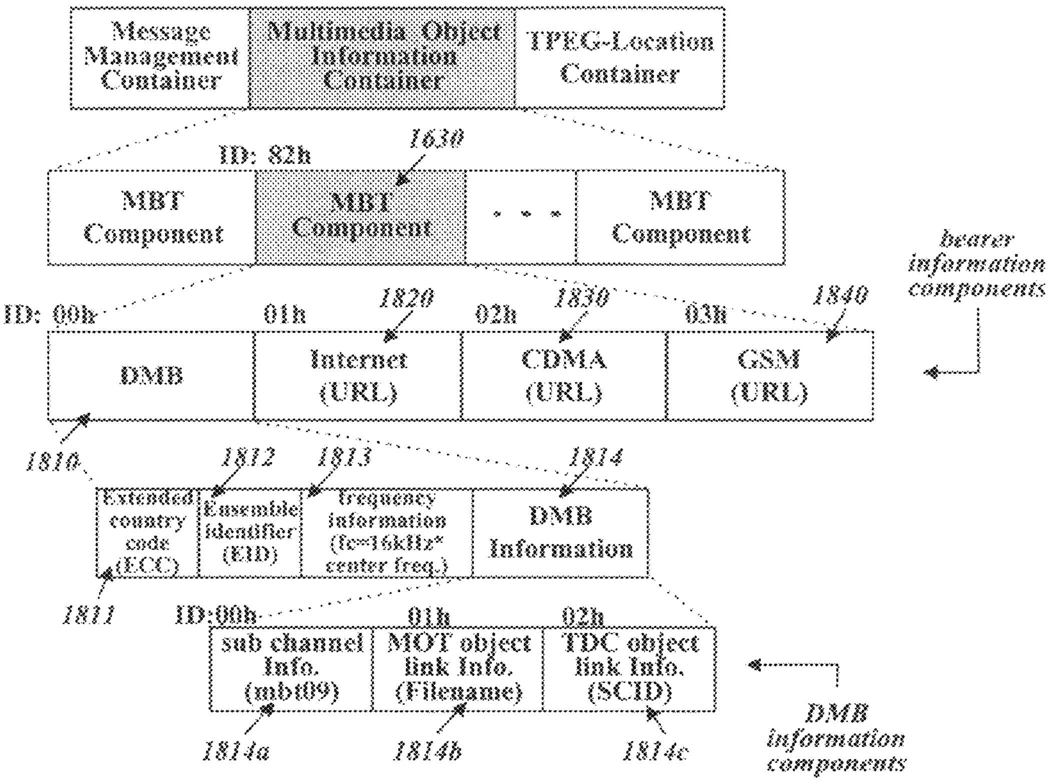
Figure 22:
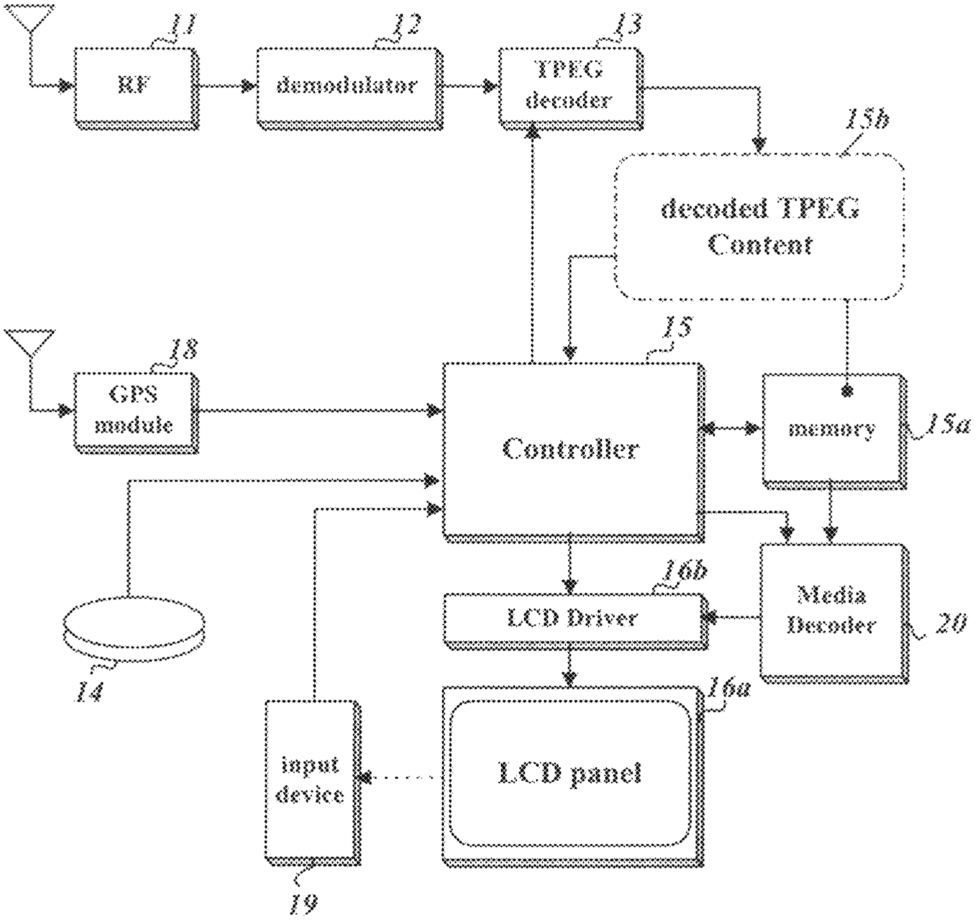
Figure 23A:
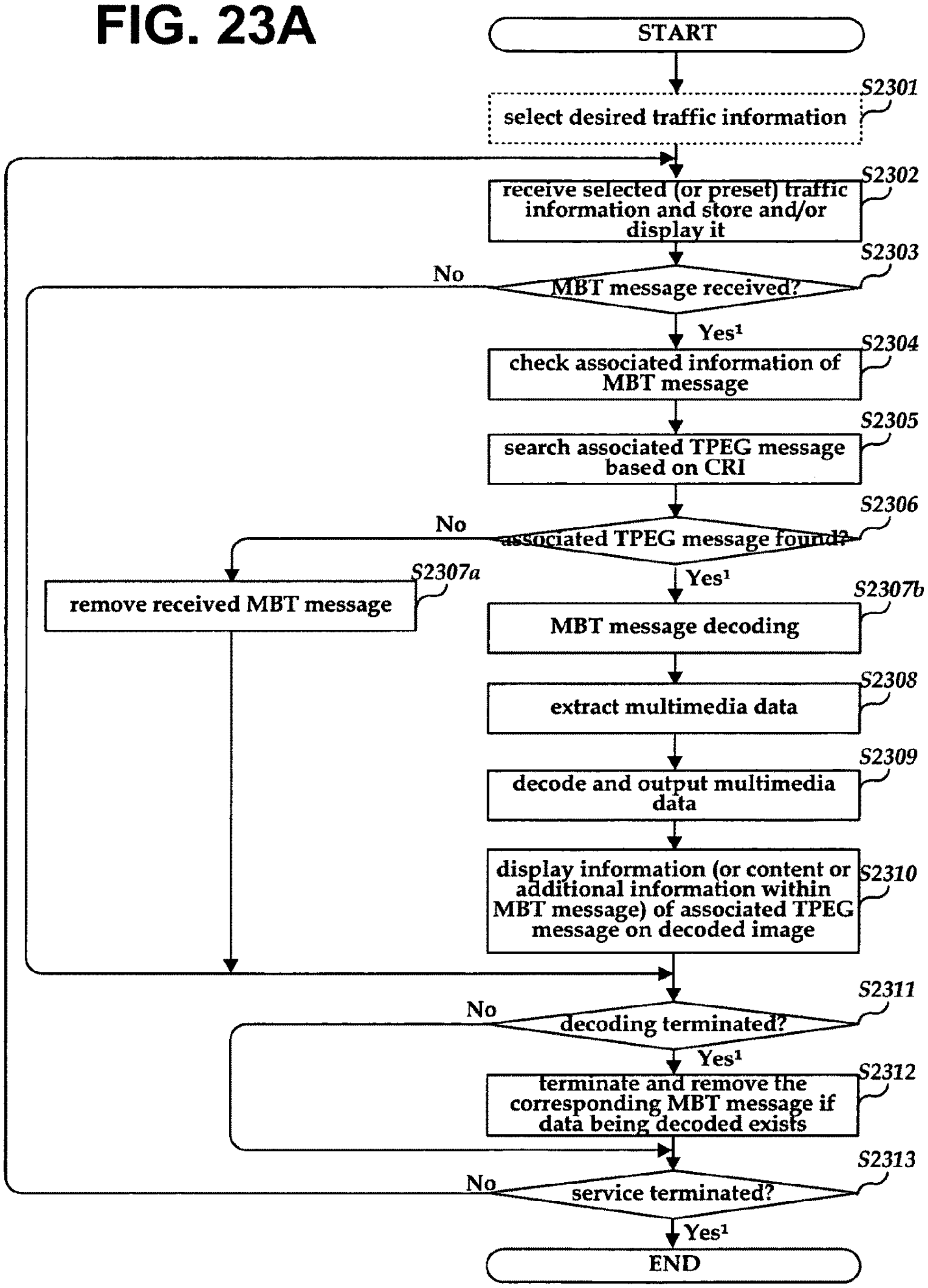
Figure 23B:
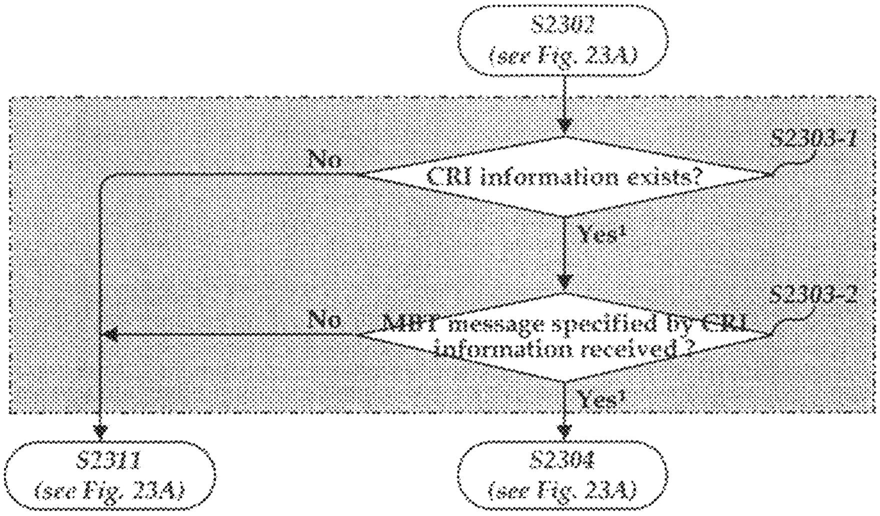
Figure 24A:
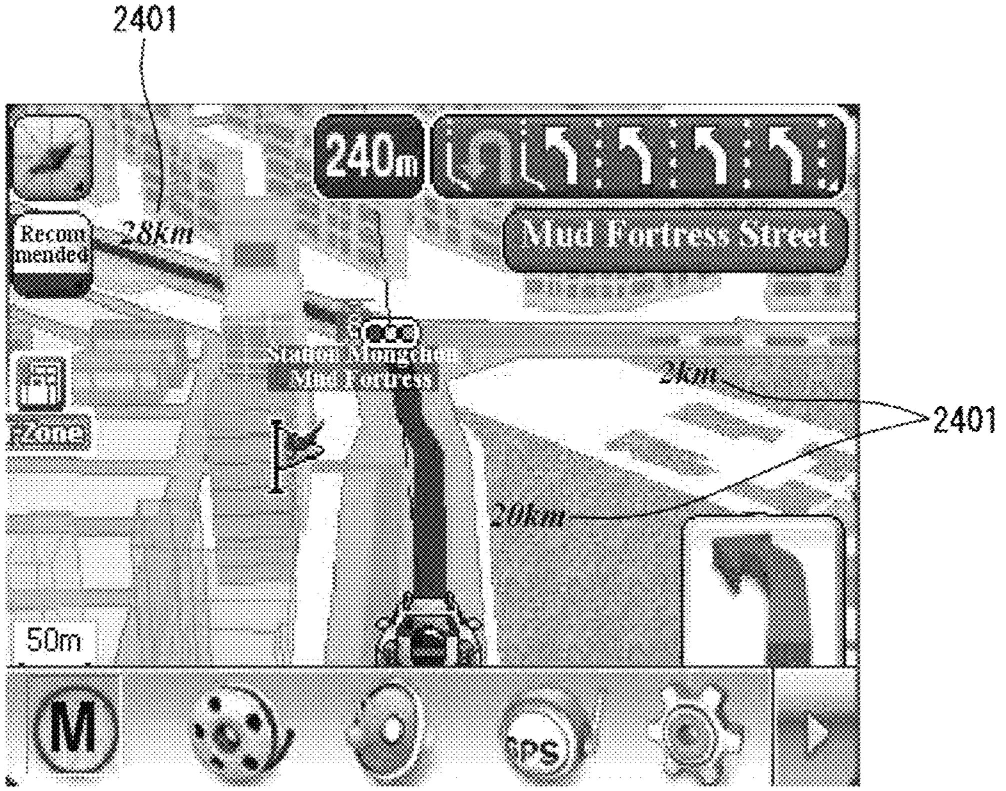
Figure 24B:
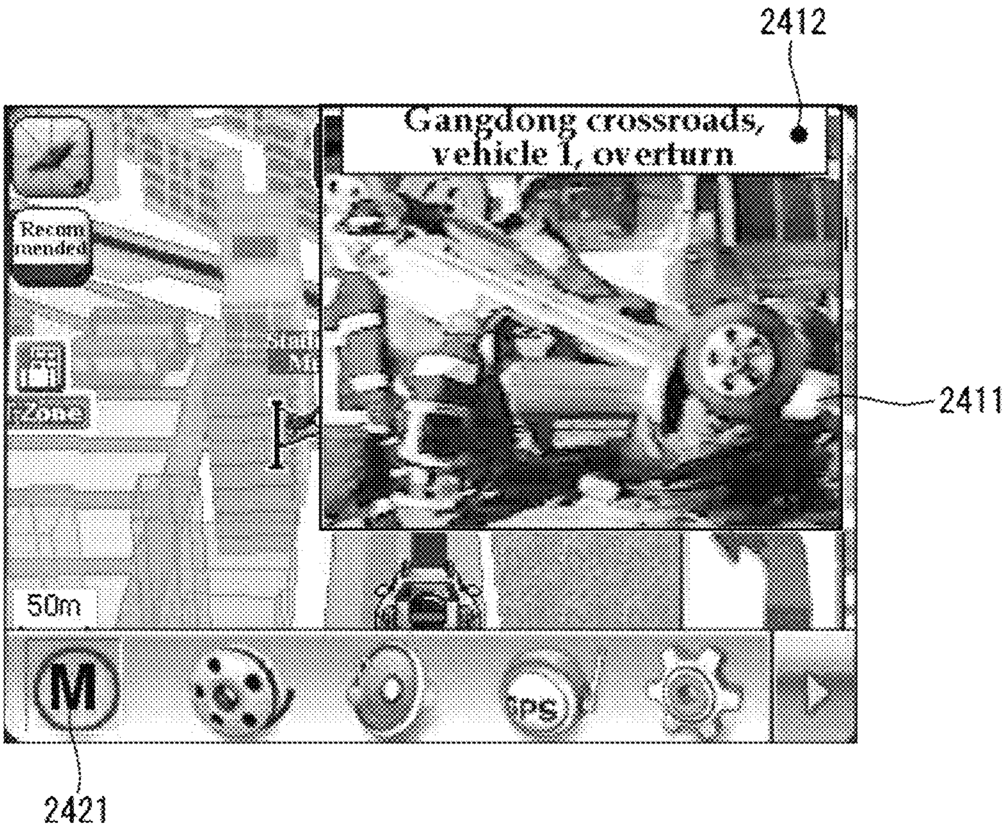
Figure 25:
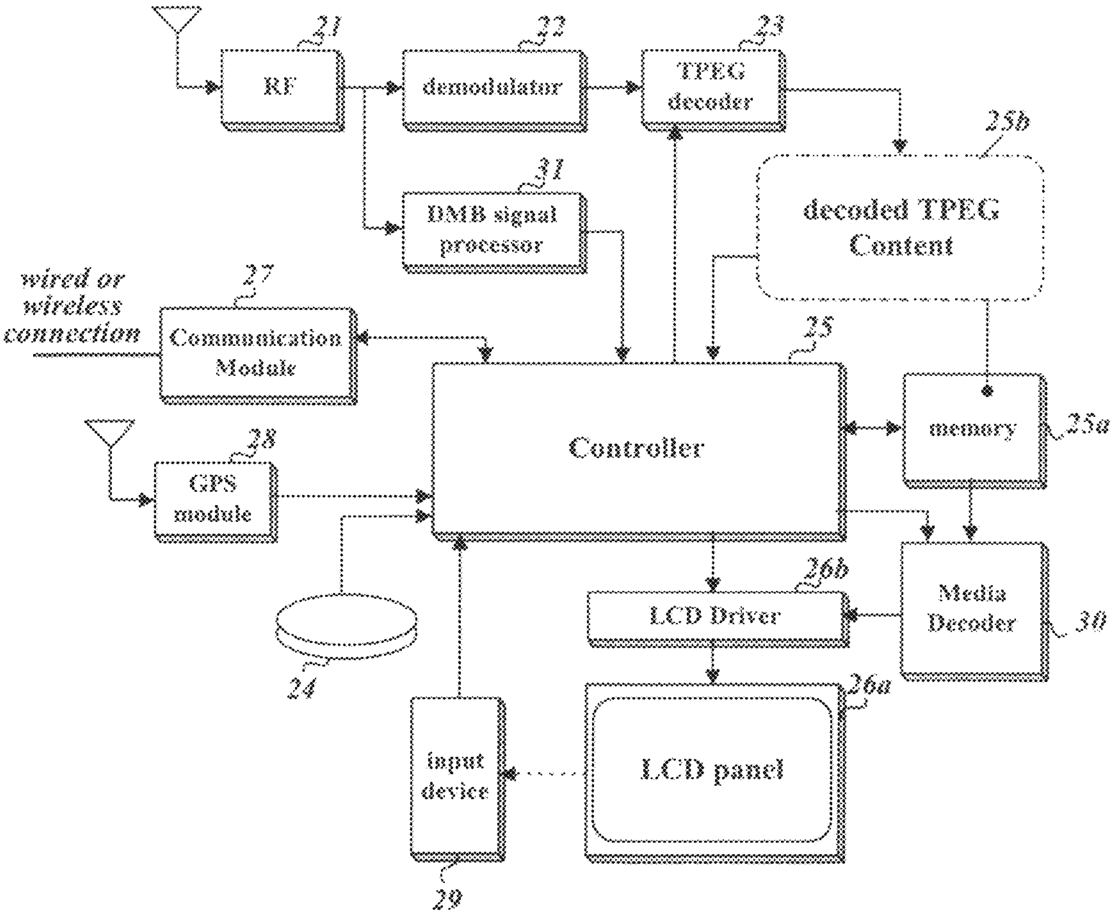
Figure 26:
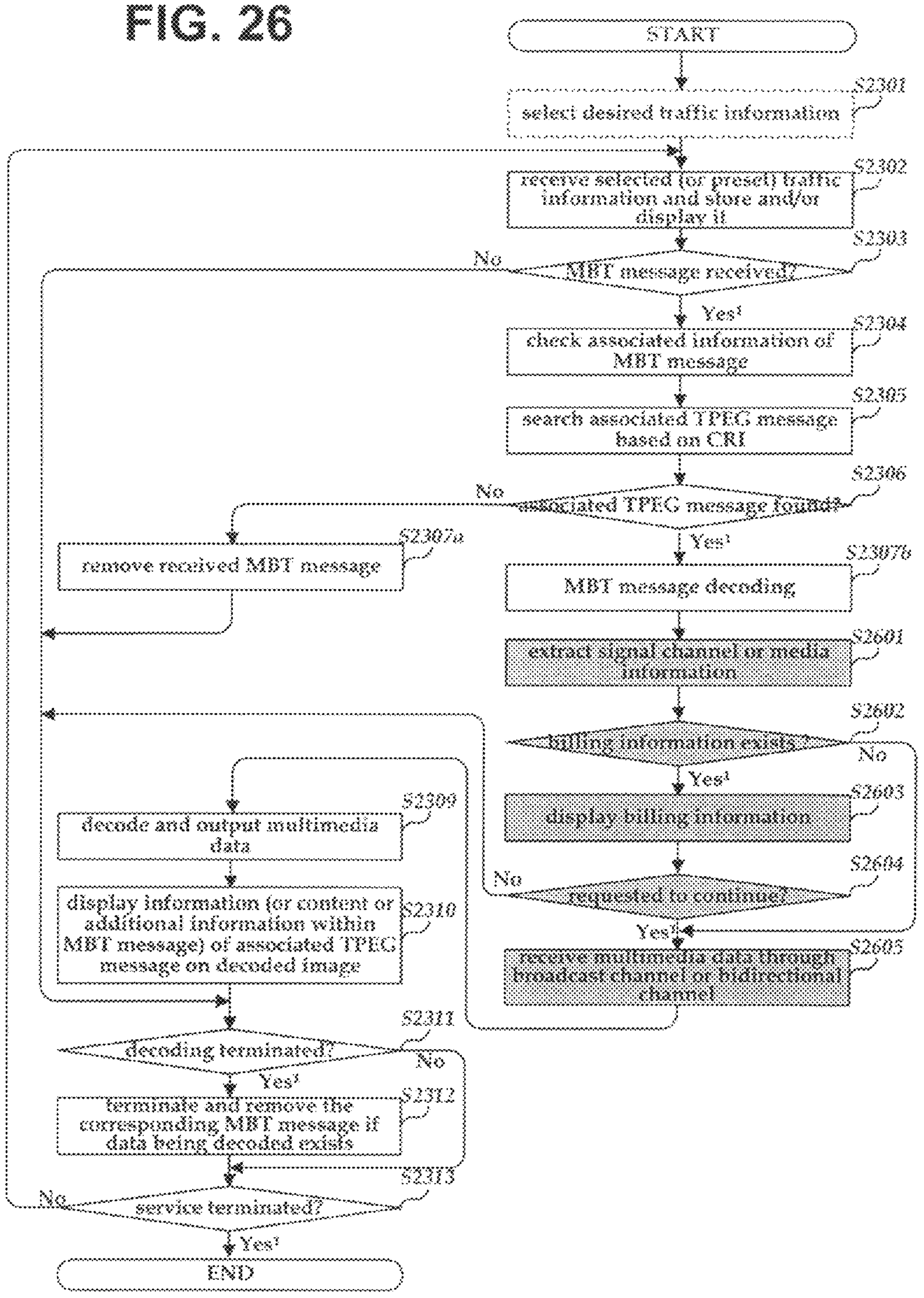
Figure 27:
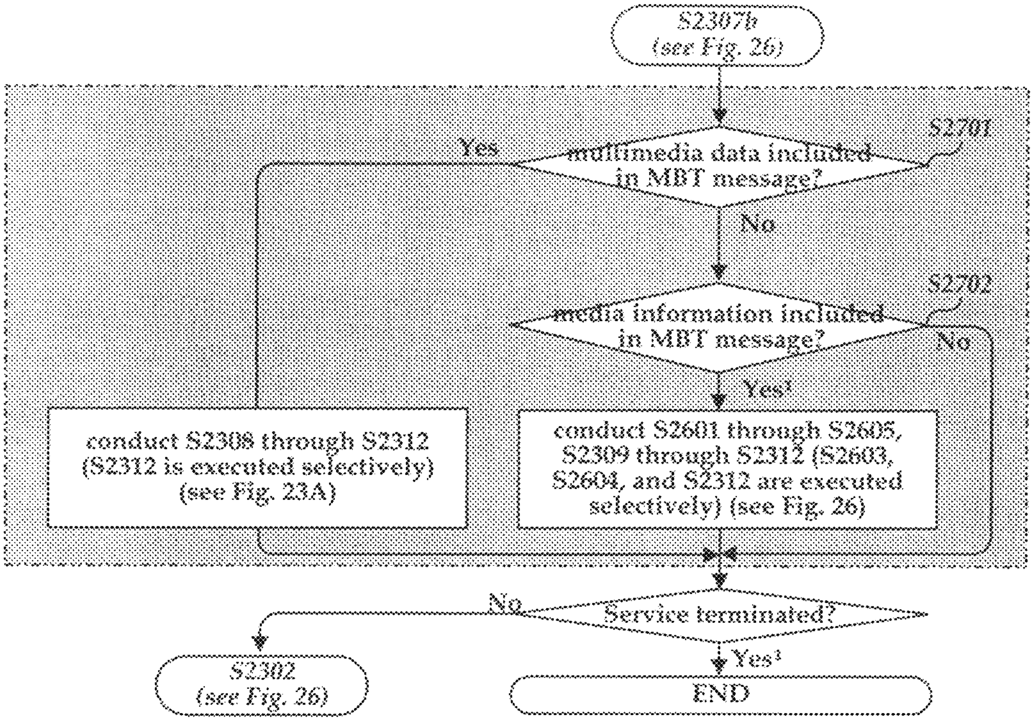

FIGS. 10A through 10H respectively illustrate syntax for organizing an object information component of FIG. 9 and sub-components thereof;

FIG. 11 illustrates a detailed structure of an object information component and accompanying transfer format according to the syntax illustrated in FIGS. 10A through 10H;

FIGS. 12A through 12D respectively illustrate syntax for organizing an information type component of FIG. 9 and sub-components thereof;

FIG. 13 illustrates a detailed structure of an information type component and accompanying transfer formation according to the syntax illustrated in FIGS. 12A through 12D;

FIG. 14A illustrates syntax for organizing a multimedia object data component of FIG. 9 according to one embodiment of the present invention;

FIG. 14B illustrates syntax for organizing a multimedia object data component of FIG. 9 according to another embodiment of the present invention;

FIG. 15 illustrates syntax for organizing an additional information component of FIG. 9;

FIG. 16 illustrates a transfer format of an MBT message organized according to another embodiment of the present invention;

FIGS. 17A through 17H respectively illustrate syntax for organizing a transmission medium component of FIG. 16 and sub-components thereof;

FIG. 18 illustrates a detailed structure of a transmission medium component and accompanying transfer format according to the syntax illustrated in FIGS. 17A through 17H;

FIG. 19 illustrates syntax for organizing billing information of multimedia data carried by the information type component of FIG. 13;

FIG. 20 illustrates a transfer format of an MBT message organized according to another embodiment of the present invention;

FIGS. 21A and 21B respectively illustrate syntax for organizing a component carrying cross-reference information specifying another application information message according to another embodiment of the present invention;

FIG. 22 illustrates a block diagram of a portable terminal or a terminal installed in a car that receives application information transmitted from an application information providing server of FIG. 1 according to one embodiment of the present invention;

FIG. 23A illustrates a flow diagram of a procedure for receiving traffic information related messages including an MBT message and providing the messages for the user according to one embodiment of the present invention;

FIG. 23B illustrates part of a procedure for receiving traffic information related messages including an MBT message and providing the message for the user according to another embodiment of the present invention;

FIGS. 24A and 24B respectively illustrate a car navigation screen displayed for the user and a screen where decoded multimedia data are displayed according to the illustrated procedures of FIGS. 23A and 23B;

FIG. 25 illustrates a block diagram of a portable terminal or a terminal installed in a car that receives application information transmitted from an application information providing server of FIG. 1 according to another embodiment of the present invention;

FIG. 26 illustrates a flow diagram of a procedure where the terminal of FIG. 25 receives traffic information related messages including an MBT message and provides the messages for the user according to another embodiment of the present invention; and FIG. 27 illustrates a flow diagram of a procedure where the terminal of FIG. 25 receives traffic information related messages including an MBT message and provides the messages for the user according to yet another embodiment of the present invention.

5. BEST MODE FOR CARRYING OUT THE INVENTION

Hereinafter, according to the present invention, preferred embodiments will be described in detail with reference to appended drawings FIG. 1 illustrates a network where a variety of information related to traffic is provided through wireless signals. In the network of FIG. 3, an application information providing server 100 in a broadcast station classifies and organizes information about congestion and road conditions (e.g., obstacles on the road) collected from various sources (e.g., operator input, information received from another server through a network 101 or probe cars), images of road traffic situation, parking information, service information of a long distance transportation means, and so on with respect to each individual application information and transmits the organized information wirelessly so that a navigation terminal installed in a car 201 or an information terminal 200 carried by the user can receive the information. An information originator that organizes a variety of application information and a carrier that transmits the organized information wirelessly can be different service providers, which are handled separately for the convenience of description of the present invention.

In what follows, described is a method by which, among the variety of application information, the application information providing server 100 organizes and transmits road situation information that is transmitted when an accident on the road or matters requiring special attention occurred.

Figure 2A:
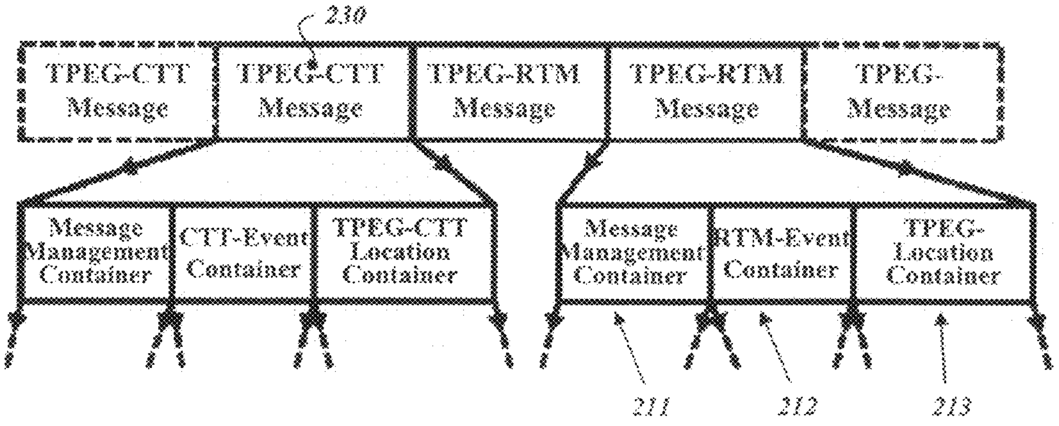
FIG. 2A illustrates a transfer format of a various application information provided through a single signal channel.

The application information providing server 100 includes road situation information in a sequence of message segments (hereinafter, it is called 'TPEG (Transport Protocol Experts Group) message') organized as shown in FIG. 2A as a single message segment. A message segment that transfers the road situation information, namely TPEG-RTM (Road Traffic Message) message comprises a message management container 211, an RTM event container 212, and a TPEG location container 213. Traffic information not related to road situation, for example a TPEG-CTT (Congestion and Travel-Time information) message for transferring transit (congestion) information of the road can be included in a different message segment 230 of the segment sequence by the application information providing server 100. As a matter of course, a variety of application information related to traffic other than the aforementioned application information can be included in the message segment sequence.

The message management container 211 for road situation information organized by the application information providing server 100 organizes the corresponding information according to the syntax illustrated in FIG. 2B. The message management container carries a message identifier (mid), message version (ver.), message generation time, message destruction time, etc. A selector of the message management container indicates whether an RTM component belonging to the RTM event container 212 is succeeding. The RTM component can store event information about road situation that requires attention from the user or can belong to the location container 213 along with location information. As a matter of course, a selector assigned to each RTM component determines whether the RTM component belongs to the RTM event container or the location container. For example, an RTM component has an identifier 0x8N (N=0~9) when the RTM component carries road situation information while an identifier 0x90 or 0xA0 is used when the RTM component carries location information.

The application information providing server 100, when accident information on the road is found in the collected information, organizes an RTM component for transferring accident information according to the syntax illustrated in FIG. 3A and organizes a message segment, namely an information message as shown in FIG. 4. A single message segment consists of only a single RTM component or multiple RTM components carrying a variety of information about road situation, for example information about road surface conditions (for example, unevenness, potholes, loose surface, rock falls, etc).

The aforementioned RTM component 401 for transferring accident information, as shown in the example of transfer information of FIG. 4, contains more than one accident component for transferring detailed information about an accident. When the accident component transfers information about accident location, the information is organized according to the syntax illustrated in FIG. 3B; as for information about location, one of predefined values for a terminal to represent location is recorded in the accident position component 411.

For description of the present invention, a notation of 'rtmNN_ii' or 'rtmNN' (NN and ii represent numerals) is used to express a particular value in the document or drawings. The notation of rtmNN_ii (or rtmNN) indicates ii value (or a single value) in the table specified by rtmNN from among multiple loc tables (or hard-coded tables) pre-stored in the terminal 200, where the meaning of the value is already defined between the application information providing server 100 and the terminal 200. Interpretation of mbtNN_ii (or mbtNN) used in the following description or figures is the same as above except that a target table is mbt table; the mbt table also contains values, the meanings of which are predefined between the traffic information providing server 100 and the terminal 200. As mentioned above, a notation of locNN or mbtNN used in the document or drawings indicates that a value defined in the corresponding table is selected. In the above example, instead of a value informing of accident location, 'rtm10' can be used, where the accident location on the road can be specified according to a code defined in rtm10 table. For example, by defining rtm10 table by assigning 1 when the accident location is first lane, 2 for second lane, 3 for third lane, 9 for first and second lane, and the like, a single value can represent a location on the road.

The application information providing server 100 can also put an accident component for transferring information about the cause of an accident in the RTM component for transferring the accident information. The cause of an accident can be an animal, a vehicle, or a human. In case of an animal, an accident component 412 is organized according to the syntax illustrated in FIG. 3C; the accident component 412 in this case carries the number of animals which caused the accident and an animal component transferring detailed accident information is also included. The animal component carries information about positions of animals, accident animal types (injury, death, etc) and the like. The method for specifying the position of an animal follows, for example the definition of the aforementioned rtm10 table. As a matter of course, information indicating which road link the position belongs to can be transferred by a different component—for example, a component belonging to a location container. If the cause of an accident is a vehicle, the accident component 413 in this case carries the number of vehicles involved in the accident and a vehicle component transferring detailed accident information. The vehicle component carries information about positions of vehicles, vehicle accident type (fire, overturn, low speed, reckless driving, etc), and the like. A method for specifying the position of a vehicle follows, for example the definition of the aforementioned rtm10 table.

If the cause of an accident is a human, an accident component 414 is organized according to the syntax illustrated in FIG. 3E. The accident component 414 in this case carries the number of persons involved in the accident and a people component transferring detailed accident information. The people component carries information about positions of people, people problem type (injury, march, riot, etc), and the like. A method for specifying the positions of people that have caused the problem follows, for example the definition of the aforementioned rtm10 table.

Meanwhile, when multimedia data about the aforementioned road accident are collected (e.g., video data), the application information providing server 100, in addition to the operation of transferring road situation information about the accident in the form of a message segment, organizes the multimedia data in the form of a message segment belonging to a different information type and transfers the organized multimedia data. In another embodiment according to the present invention, if the multimedia data are provided through a signal channel or a medium different from another signal channel or medium that provides the traffic related information, access information about the multimedia data are organized into separate message segments and thus transferred. A message segment for transferring multimedia data about road situation or information about the data is organized as shown in FIG. 5 by the same method applied to information for other traffic related application services and is transferred through the same signal channel or through a different signal channel along with message segments for other application services.

A signal channel transferring the information for application services is organized as shown in FIG. 6A. The organization of a data frame within the signal channel can be carried out by the application information providing server 100 or by a separate signal carrier 110. At this moment the signal carrier 110 can organize a data frame as shown in FIG. 6A by receiving application information from servers providing information for other application services in addition to the application information providing server 100.

To describe data frame organization of FIG. 6A more specifically, SCID (Service Component ID) is assigned to each individual application service; a message of application information belonging to the same service, namely more than one message segment is inserted into each service component frame distinguished from each other by SCID. The application information providing server 100 (or the signal carrier 110), as shown in FIG. 6A, to inform the terminal of various application information currently provided by a data frame, inserts a service component frame 601 of SNI (Service & Network Information) data with SCID 0 into each data frame. The SNI service component frame 601 has a structure as shown in FIG. 6B and contains more than one SNI component. A component of an identifier 0x01 among the SNI components includes a service table guide organized according to the syntax as shown in FIG. 6C. The service table guide, as shown in the figure, comprises multiple guide elements (line_of table_1) 610. Each guide element 610 includes a service component ID (SCID), content ID (COID), and application ID (AID). Each guide element is selectively included when the service ID (SID) 611 (The SID consists of "SID-A, SID-B, and SID-C") of an information originator which organizes and provides information is different from service ID of a signal carrier transmitting information. A set of identification information (COID, AID, and SID of an information originator) included in each guide element 610 can uniquely specify an application information service. In this way, each guide element 610 transfers information of SCID assigned to a service component frame for a single application information service.

The SCID is sufficient to specify service component frames for a single application information service within a service signal channel provided by a single signal carrier. If the SCID is changed as time elapses, since the values for a set of identification information (COID, AID and SID of the information originator) within the service table guide organized and transferred as shown in FIG. 6C are changed accordingly and transferred, a terminal can know SCID assigned to the application information service that the terminal tries to receive from the information carried by SNI component. In case of an application information service transferred to a different signal channel through a different signal carrier, a terminal can know SCID assigned to an application information service that the terminal tries to receive from the information of SNI component organized as shown in FIG. 6C, transferred through signals for the service. For example, if the application information providing server 100, to specify an application service transferred through a different signal channel, transfers media information for accessing the signal channel (e.g., frequency band) and AID or the set of identification information (COID, AID, and SID of an information originator), a terminal can know SCID of an application service within a different signal channel by using the information from a service table guide received through the different signal channel.

In what follows, a method for organizing a message of FIG. 5 is described in detail, where multimedia data related to road situation or information about multimedia data is transferred.

The application information providing server 100 organizes a message segment for multimedia data about road situation or information about multimedia data (hereinafter, it is called 'MBT (Multimedia-Based Traffic & Travel) message segment' or 'MBT message' for short) as a message management container 510 and a multimedia object information container 520. A TPEG location container 530 can also be included if required. As for the message management container 510, the information is organized according to the syntax illustrate in FIG. 7 and the message management container 510 carries information about a message identifier (mid), message version (ver), message occurrence time, message destruction time, message start time and message stop time. Message start time and stop time can be used to display for the user the time that succeeding data have started (or are to be started) and stopped (or are to be stopped). Also, cross-reference information 710 (CRI: Cross Reference Information) for referring to a message segment carrying data to which multimedia information carried by a currently organized message segment is related is inserted into the message management container 510.

Figure 7:
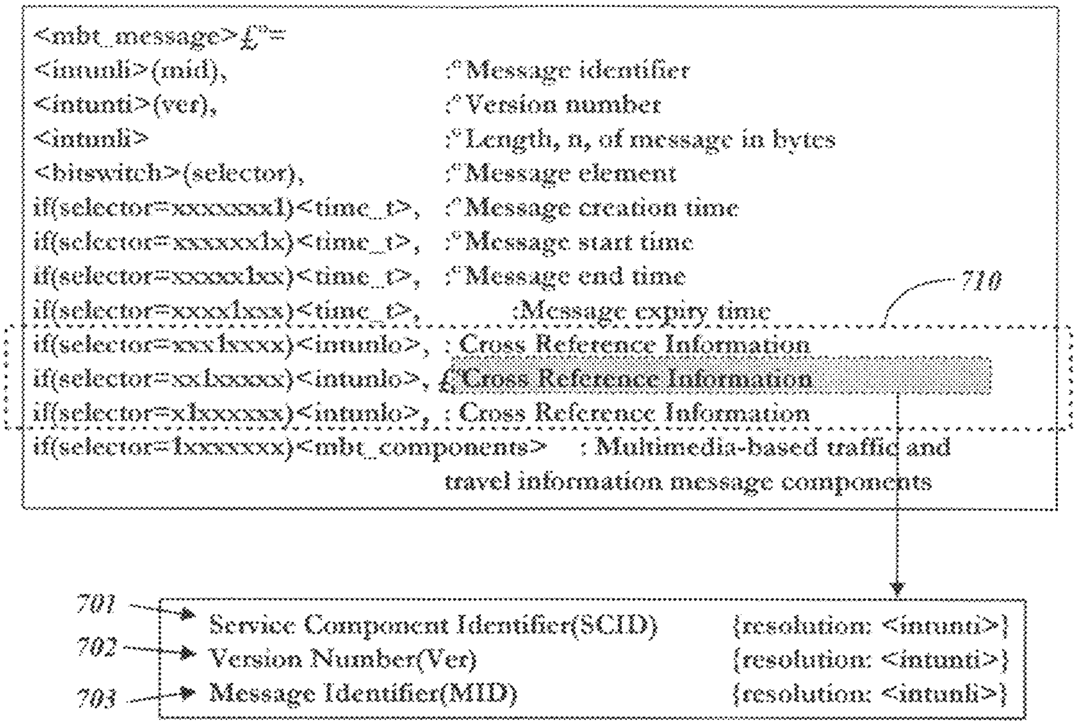
FIG. 7 illustrates an example of syntax for organizing message management information of an MBT message provided in the transfer format of FIG. 5.

As shown in FIG. 7, the cross-reference information 710 comprises one byte (intunti: integer unsigned tiny) of SCID 701 as described above, one byte (intunit) of version number (Ver) 702 stored in a message management container of an associated message segment, and two bytes (intunli: integer unsigned little) of message ID (MID) 703. For one type of an application information service, one message segment, namely information service, can be uniquely specified by a message identifier. As for information messages carrying traffic information about the same location, for example the same link, however, identical message identifier can be used for the messages and the messages can be differentiated by a version number. Therefore, in case one information message can be specified by using a message identifier and a version number together, the cross-reference information is organized as shown in FIG. 7; if a message identifier is found sufficient, a version number may not be included in the cross-reference information.

An appropriate value is assigned to a selector indicating the type of information included in the message management container according to the syntax of FIG. 7. The selector also indicates whether an MBT component belonging to the multimedia object information container 520 and/or a TPEG location container 530 succeeds the information. In one embodiment according to the present invention, considering a case where information about multimedia data stored in an information message is associated with multiple message segments carrying traffic related information, multiple fields are prepared in the message management container 510 for cross-reference information. In another embodiment according to the present invention, cross-reference information is organized as a single field.

When SCID of each individual application service is determined by the signal carrier 110 rather than the application information providing server 100, SCID assigned to each individual application service is received from the signal carrier 110 and the value of SCID assigned to the associated application information can be recorded in the corresponding field within the cross-reference information. Version number and the value of a message ID within the cross-reference information can be received from a different server providing application information associated with multimedia data or recorded by receiving the version number and the value of the message ID from the operator.

Figure 8:
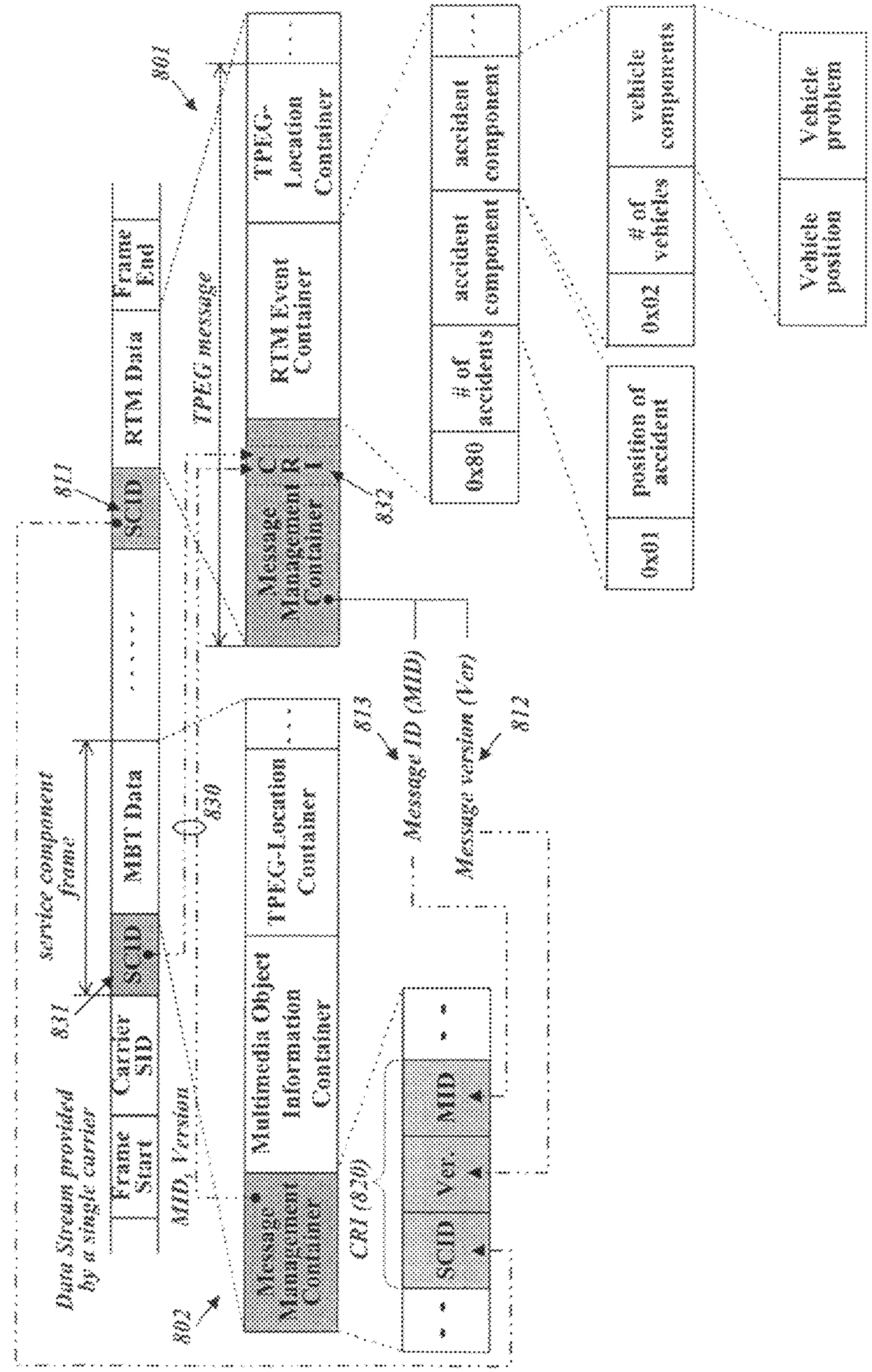
FIG. 8 illustrates an example when an MBT message is associated with a message of different application information and cross-reference information according thereto is written into each message.

FIG. 8 illustrates an example where cross-reference information is recorded in the information messages associated with each other according to one embodiment of the present invention. To describe the illustrated example of information in detail, after occurrence of a car accident on the road, information about the accident is obtained and a message segment 801 about road situation is organized by using the accident information—for example, location of accident vehicle, vehicle problem, and the number of accident vehicles—and transferred. By the time of the transfer or after the transfer, when multimedia data about the accident situation, for example video data that recorded the situation or information about a media channel that provides the video data is obtained and the application information providing server 100 writes an MBT message segment 802 about the situation, SCID 811 assigned to a service component frame carrying RTM data and version number 812 and identifying information 813 of a message recorded in a message management container of the message segment carrying the vehicle accident information are recorded in the corresponding fields of cross-reference information fields 820 within the message management container of the MBT message segment 802. The content illustrated in FIG. 8 is only a simple example intended to support understanding; multimedia data transferred by the MBT message segment or information about the data can be associated with various application information (for example, they can be associated with average speed information of a particular link in a road congestion information service). In addition, associating multimedia information with various application information not described here by utilizing the principles disclosed for the present invention without further creative consideration of those skilled in the art should necessarily be considered to belong to the scope of the present invention.

Also, when the application information providing server 100 organizes multimedia data associated with information carried by an information message (which is called alternatively 'TPEG message') provided through a different application service or information about multimedia data into an MBT message segment and transfers the MBT message segment as described above, a message ID assigned to the MBT message segment 802, version number, and the value of SCID 831 assigned to a service component frame for transferring the MBT message segment 802 can be recorded in the cross-reference information (CRI) field 832 prepared in a management container of the associated TPEG message 830.

In what follows, a method for organizing multimedia data that can be associated with particular application information as a TPEG message and transferring the TPEG message is described in detail.

As shown in FIG. 8, the application information providing server 100 inserts more than on MBT component into the multimedia object information container 520. The MBT component is classified into an object information component (MBT component of identifier 0x80) 910, information type component (MBT component of identifier 0x81) 920, multimedia object data component (MBT component of identifier 0x83) 940, and additional information component (MBT component of identifier 0x8A) 950 according to the type of information carried by the MBT component.

As for the object information component 910, the application information providing server 100 organizes the information according to the syntax illustrated in FIG. 10A and more than one object component is included according to the transfer format illustrated in FIG. 11. The included object component is classified into execution classification object component (object component of identifier 0x00) 1110, object classification object component (object component of identifier 0x01) 1120, object size object component (object component of identifier 0x02) 1130, and compression information object component (object component of identifier 0x03) 1140 according to the value of the identifier. The execution classification object component 1110 organizes the information according to the syntax illustrated in FIG. 10B and contains a value (mbt01) specifying execution type of multimedia data carried by the succeeding MBT component. A value specifying execution type can be, for example, 1 for the case of 'no execution', 2 for the case of 'execution once', 3 for the case of. 'continuous execution', and 0 for the case of 'unknown'.

The object classification object component 1120 organizes the information according to the syntax illustrated in FIG. 10C and includes information about object type in more than one object format component. First, when multimedia data contained in the succeeding MBT component are video, a value (mbt02) specifying video object type is included in the object type video component (object format component of identifier 0x00) 1121 whose information is organized according to the syntax illustrated in FIG. 10D. A value for specifying video object type is, for example, 1 when video type is MPEG I video[1], 2 for MPEG II video[2], 3 for MPEG 4 video[3], 4 for H263, 5 for H264, and 6 for AVI. As a matter of course, a different value can be assigned for the corresponding type not specified here. In what follows, although several examples of assigning values (mbtMM) to different types are introduced for the purpose of understanding, the range of allowed assignment is not limited by the examples.

When multimedia data contained in the succeeding MBT component are audio, a value (mbt03) specifying audio object type is included in the object type audio component (object format component of identifier 0x01) 1122 whose information is organized according to the syntax illustrated in FIG. 10E. A value for specifying audio object type is, for example, 1 when audio type is MPEG I audio layer I[4], 2 for MPEG I audio layer II[4], 3 for MPEG I audio layer III[5], and 7 for uncompressed PCM audio.

When multimedia data contained in the succeeding MBT component are image, a value (mbt04) specifying image object type is included in the object type image component (object format component of identifier 0x02) 1123 whose information is organized according to the syntax illustrated in FIG. 10F. A value for specifying image object type is, for example, 1 when image type is GIF, 2 for JFIF[7], and 3 for BMP.

As for the object size object component 1130, the application information providing server 100 organizes the information according to the syntax illustrated in FIG. 10G; byte size of multimedia data contained in the succeeding MBT component is recorded in a field of four bytes (intunlo: integer unsigned long). As for the compression information object component 1140, the information is organized according to the syntax illustrated in FIG. 10H; a value (mbt05) specifying a method for compressing multimedia data carried by the succeeding MBT component is recorded in the corresponding object component. A value for specifying a compression method is, for example, 0 for the case of 'unknown' and 1 for the case of Gzip compression data format.

As for the information type component 920 included in the multimedia object information container 520, the application information providing server 100 organizes the information according to the syntax illustrated in FIG. 12A, including more than one application information component according to the transfer format illustrated in FIG. 13. The included application information component is classified into information identification component (application information component of identifier 0x00) 1310, collector component (application information component of identifier 0x01) 1320, and content description component (application information component of identifier 0x02) 1130 according to the value of the identifier. The information identification component 1310 organizes the corresponding information according to the syntax illustrated in FIG. 12B, including a value (mbt06) for identifying an application service provided by multimedia data contained in the succeeding MBT component or an application service with which the multimedia data are associated. A value for specifying an application service is, for example, 5 for the case of congestion traffic information service and 10 for multimedia based traffic information.

As for the collector component 1320, the application information providing server 100 organizes the information according to the syntax illustrated in FIG. 12C, recording in the corresponding component a value (mbt07) for identifying a subject that collected multimedia data contained in the succeeding MBT component. The value for identifying a subject that collected multimedia data is, for example 1 for the case of a public institution, 2 for the case of a private institution, and 3 for the case of media. The content description component 1330 also organizes the information according to the syntax illustrated in FIG. 12D, recording description information about multimedia data contained in the succeeding MBT component in the form of a short text (short_ string) of 255 characters or less (in case of an English sentence). In addition, a value (mbt08) specifying a language to express the text is included in the component.

As for the multimedia object data component 930 included in the multimedia object information container 520, the application information providing server 100 organizes the information according to the syntax illustrated in FIG. 14A, including actual multimedia data in the component, for example video data, still image data, audio data or image data. Since a field indicating the length of data carried by a component is defined to occupy four bytes (intunlo), the maximum size of multimedia data that can be carried by the corresponding component can be 4 Gbytes. In another embodiment of the present invention, multimedia data can be transferred in segments. In the present embodiment, the information of a multimedia object data component is organized according to the syntax illustrated in FIG. 14B. Different from the syntax illustrated in FIG. 14A, the syntax of FIG. 14B includes the number of multimedia segments 1401 and information 1402 about the order of the multimedia segment carried by a current component with respect to the entire data.

The application information providing server 100, when additional description about a current TPEG message for multimedia information is required, an additional component 940 is organized according to the syntax illustrated in FIG. 15 and included in the multimedia object information container 520. The additional information component 940 records text information of 255 bytes or less required for description of a TPEG message or information contained in the message along with a value (mbt08) specifying a language to express the text.

In what follows, a method for organizing information about multimedia data into a TPEG message and transferring the message according to another embodiment of the present invention is described in detail, the multimedia data that can be associated with particular application information being provided through a different signal channel or media.

In the present embodiment, as shown in FIG. 16, the application information providing server 100 organizes more than one MBT component and includes the organized component in the multimedia object information container 520. As shown in the figure, the MBT component is classified into an object information component (MBT component of identifier 0x80) 1610, information type component (MBT component of identifier 0x81) 1620, transmission medium component (MBT component of identifier 0x82) 1630, and additional information component (MBT component of identifier 0x8A) 1650 according to the type of information that the MBT component carries.

Since organization of the object information component 1610, information type component 1620, and additional information component 1650 have been fully described in the above embodiments, further description is not provided. However, while in the aforementioned embodiment, the object information component 1610 and information type component 1620 carry information about multimedia data carried by the succeeding MBT component, the present embodiment deals with a case where the object information component 1610 and information type component 1620 carry information about multimedia data provided through a different signal channel or a different transmission medium.

As for the transmission medium component 1630, the application information providing server 100 organizes the information according to the syntax illustrated in FIG. 17A; the transmission medium component records information about a signal channel or a transmission medium through which multimedia data associated with information within a traffic-related TPEG message specified by cross-reference information within the message management container 510 and information for identifying the multimedia data.

The transmission medium component includes more than one bearer information component according to the transfer format illustrated in FIG. 18. The included bearer information component is classified into DMB (Digital Multimedia Broadcast) component (bearer information component of identifier 0x00) 1810, Internet component (bearer information component of identifier 0x02) 1820, CDMA component (bearer information component of identifier 0x02) 1830, and GSM component (bearer information component of identifier 0x03) 1840 according to the identifier value. Besides the aforementioned transfer media, separate bearer information components can be defined for other transfer media.

The DMB component 1810 is generated when associated multimedia data are broadcast through DMB; the corresponding information is organized according to the syntax illustrated in FIG. 17B and includes national code 1811 about a region for which associated multimedia data are broadcast, ensemble identifier 1812, frequency information of DMB 1813, and DMB information 1814. The ensemble identifier can be used for a key required to demodulate DMB signals into digital data. The frequency information 1813, as shown in FIG. 17B, transfers a value about a center frequency; the value consists of 24 bits (5 most significant bits are filled with zeros), which is a carrier frequency divided by 16 kHz. As shown in FIG. 18, the DMB information 1814 is organized in the form of a DMB information component. The DMB information component is classified into sub-channel information component (DMB information component of identifier 0x00) 1814*a*, MOT object link information component (DMB information component of identifier 0x01) 1814*b*, and TDC object link information component (DMB information component of identifier 0x02) 1814*c* according to the value of the identifier.

The sub-channel information component 1814*a* organizes the corresponding information according to the syntax illustrated in FIG. 17C, including a value (mbt09) indicating a data transfer method of the corresponding channel. The value indicates which method is applied to the corresponding associated multimedia data in a DMB channel. For example, 1 is assigned for the case of a method based on MOT (Multimedia Object Transfer) specifications and 2 is assigned for the case of a method based on TDC (Transportation Data Channel) specifications. Besides the above specification, a different transfer method can also be specified; DMB information component for identifying multimedia data can be additionally defined and used for the transfer method.

If associated multimedia data are being transferred through DMB signals according to MOT specifications, the application information providing server 100 organizes MOT object link information component 1814*b* according to the syntax illustrated in FIG. 17D and includes the organized component in the DMB component 1810. According to MOT specifications, since identification of an object to be transferred utilizes a file name, the name of a file including associated multimedia data, for example still image or a short video clip is recorded in the MOT object link information component 1814*b*. If associated multimedia data are being transferred through DMB signals according to TDC specifications, the application information providing server 100 organizes TDC object link information component 1814*c* according to the syntax illustrated in FIG. 17E and includes the organized component in the DMB component 1810. According to MOT specifications, since data to be transferred can be identified by SCID, the value of SCID assigned at the head of a service component frame carrying associated multimedia data is recorded in the TDC object link information component 1814*c*. Since transfer of multimedia data based on TDC specifications is advantageous for transferring video data in the form of streams, by associating information about real-time video of an accident through the TDC object link information component, the user can watch the video as needed.

Meanwhile, the Internet component 1820 is generated when associated multimedia data are accessed or obtained through the Internet; the corresponding information is organized according to the syntax illustrated in FIG. 17F, including unique location information on a network, for example URL (Universal Resource Locator) through which associated multimedia data can be accessed. Besides the above, the CDMA component 1830 is generated according to the syntax illustrated in FIG. 17G when associated multimedia data are accessed or obtained through CDMA (Code Division Multiple Access) mobile communications network; the GSM component 1840 is generated according to the syntax illustrated in FIG. 17H when associated multimedia data are accessed or obtained through GSM (Global System for Mobile Communication) mobile communications network. Both components record unique location information (e.g., URL) of associated multimedia data, namely resources.

Meanwhile, when multimedia data about road situation are provided through a different medium or a different signal channel rather than a signal channel through which TPEG messages of traffic information are provided, use of the information can be charged. Therefore, billing information of multimedia data can be carried by MBT message. Things related to billing information are organized in the form of an application information component carried by the information type component 1620. The application information component at this moment has an identifier of 0x03 and is organized according to the syntax illustrated in FIG. 19. The application information providing server 100 receives billing information from a server providing associated multimedia data, classifies the information according to the type, organizes a billing information component, and composes an application information component of an identifier 0x03. The billing information component can record, for example information whether billing is based on time or data size, price for reference time or reference data size, service charge according to time period, and so on.

Multimedia data about road situation can be provided in low quality when TPEG messages are utilized whereas the same data can be provided in high quality through a different signal channel or a different medium. That is to say, multimedia data about road situation can be provided through the same channel as the signal channel through which traffic-related messages are transferred and at the same time, through a different channel or through a different medium. Therefore, both embodiments described with reference to FIGS. 9 and 16 can be combined so that they can be implemented in a form where information of MBT service is provided as shown in FIG. 20. Meanwhile, in the aforementioned embodiments, fields of cross-reference information to be recorded in a message management container can be insufficient. For example, the number of TPEG messages of a different application service associated with multimedia data can be more than four. Therefore, in another embodiment of the present invention, instead of the form of a component included in a message management container, by transferring cross-reference information in the form of a component included in a multimedia object container, cross-reference information about a larger number of associated TPEG messages can be transferred. In the present embodiment, cross-reference information is transferred being carried by, for example an MBT component (hereinafter, it is called 'CRI information component') of identifier 0x85 and the corresponding information of the MBT component is organized according to the syntax illustrated in FIG. 21A. The CRI information component includes a value about the number of contained CRI element components and as many CRI element component as the value. The individual CRI element component organizes the corresponding information according to the syntax illustrated in FIG. 21B; each individual CRI element component has an identifier of 0x00 and in the same way as the cross-reference information recorded in the aforementioned message management container, includes SCID assigned to a service component transferring a TPEG message of an associated application service, a message identifier assigned to the TPEG message, and a version number.

FIG. 22 illustrates a block diagram of a terminal according to one embodiment of the present invention that receives a TPEG message sequence carrying traffic-related information including information of MBT service from the application information providing server 100 organized as described above; the content of FIG. 22 assumes an embodiment where multimedia data are provided through a TPEG message of MBT service. FIG. 23A illustrates an example of a procedure where associated multimedia data are provided to the user; the procedure is carried out by the terminal of FIG. 22 and will be described in detail along with the operations of the terminal of FIG. 22.

The terminal of FIG. 22 comprises a tuner 11 resonating at the required frequency band of broadcasting signals of a TPEG message sequence and subsequently outputting modulated application information signals, a demodulator 12 outputting a sequence of transfer frames as shown in FIG. 6A by demodulating the modulated application information signals, a TPEG decoder 13 decoding the demodulated individual transfer frame and acquiring information of various application services, a GPS module 18 for calculating a current position (i.e., latitude, longitude, and altitude) by receiving signals from a plurality of satellites, a storage means 14 storing various graphic data, an input unit 19 receiving user inputs, a controller 15 controlling screen display based on the user's input, current location, and acquired application information, memory 15*a* storing required information temporarily, an LCD panel 16*a* for video display, and a media decoder 20 decoding media data of various encoding format by using a relevant method and outputting the media data as audio and/or video signals. The input unit 19 can be an interface equipped on the LCD panel 16*a*, e.g., a touch screen. The storage means 14 can be equipped with an electronic map storing information about each link on the road and lane information and information about the nodes of the link.

The tuner 11 resonates at the signals that the application information providing server 100 transmits and the demodulator 12 demodulates the resonated signals in a predetermined way and outputs the demodulated signals as a transfer frame sequence. The TPEG decoder 13 then extracts each individual transfer frame from the input transfer frame sequence, extracts a TPEG message within each service component frame included in the transfer frame, decodes the extracted TPEG message, and stores the decoded TPEG message into the memory 15*a*, S2302. In another embodiment according to the present invention, instead of decoding the entire service component frame with the transfer frame, only a service component frame carrying application information corresponding to an application service specified by the controller 15 according to the request from the user is extracted and a TPEG message within the component frame can be decoded. For this purpose, the TPEG decoder 13 should know an association value between application service identifier (AID) and SCID assigned to the head of each service component frame, which can be identified by the corresponding information between each AID stored in a service table guide constructed from the information organized as shown in FIG. 6C and assigned SCID, the information being obtained from decoding data (SNI data) within a service component frame where SCID within a transfer frame illustrated in FIG. 6A is assigned as 0. When an application service is specified, that is to say when AID is specified, SCID corresponding to the AID is checked and a service component frame to which the SCID is prefixed is specified; subsequently, only the specified frame is extracted and a TPEG message within the frame is decoded, being stored in the memory 15*a*.

Decoded TPEG content 15*b* stored in the memory 15*a* contains the aforementioned multimedia data as well as traffic information. Since the present invention is related to technology for providing multimedia data associated with traffic information, things related to traffic information are described only as much as required to help understanding of the present invention. Also, since decoding of a received TPEG message can be understood intuitively based on the aforementioned organization of a transfer format and syntax of component associated therewith, detailed description about decoding procedure will be omitted.

The content decoded by the TPEG decoder 13 includes information of MBT service and traffic information on the road (e.g., road congestion information, road situation information, etc). The decoded content is stored as a database according to a predefined method between the TPEG decoder 13 and the controller 15. For example, the decoded content is classified according to respective services; for each application service, the content is stored as a database according to link (for the case of road congestion information), road obstacle type (for the case of road situation information) or associated service (for the case of MBT service information). As a matter of course, in case of storing as a database, too, information included in a message management container within a received TPEG message is stored together. Storing the information together is required for destruction or update of received information and is also required for searching for a TPEG message corresponding to the case referred to by an MBT message. In addition, when decoded information is stored, SCID is also stored where the SCID has been prefixed to a service component frame that carried the information.

Traffic information (road congestion information, road situation information, etc) stored in the memory 15*a* as described above is displayed on the LCD panel 16*a* under the control of the controller 15 according to the request of the user or predetermined conditions S2302. For example, as shown in the screen example of FIG. 24A, while a navigation screen of a vehicle is displayed centering around a current road segment identified from the GPS module 8, average speed of a road segment in the navigation direction obtained from received road congestion information is displayed near the corresponding segment 2401. As a matter of course, color can be utilized instead of numerals. At this moment, among graphic map data stored in the storage means 14, data corresponding to the current location are displayed on the LCD panel 16*a* as a background screen of the navigation screen.

While the traffic information received by the above manner is decoded and displayed, the controller 15 continuously checks whether information of an MBT service exists in the TPEG content 15*b* decoded and stored within the memory

15*a*, S2303. If the information of an MBT service is stored, management information belonging to a management container of the MBT message is checked S2304; if the management information is found to be valid as of present, namely message destruction time illustrated in FIG. 7 is behind current time, a TPEG message specified by cross-reference information (CRI) within the management information is searched for in the stored TPEG content 15*b*.

If an associate TPEG message is not found received MBT message is destructed S2307*a*; if an associated TPEG message is found, the content of the TPEG message is decoded S2307*b* or traffic information associated with multimedia data is obtained based on the information decoded from the associated TPEG message. Subsequently, the corresponding MBT message is decoded and multimedia data and associated information are obtained. The obtained information includes information carried in a transfer format illustrated in FIG. 11 and/or FIG. 13. The controller 15 delivers information about execution type obtained from an execution classification object component 1110 illustrated in FIG. 11, information obtained from an information object classification object component 1120 (e.g., multimedia data type, encoding format, etc), size information obtained from an object size object component 1130, and information about compression type obtained from a compression information object component to the media decoder 20 and information obtained from an information type component 920 illustrated in FIG. 13 is used to be displayed for the user.

Multimedia data within a multimedia object data component organized according to the syntax of FIGS. 14A and 14B are extracted from the corresponding MBT message S2308. For the case of the embodiment of FIG. 14B, multimedia data are extracted from more than one multimedia object data component; extracted data are fed into the media decoder 20 according to the order (seq_no) and decoding is requested. The media decoder 20 decodes the input multimedia data based on the information fed from the controller 15, S2309. The controller 15 determines the position on the LCD panel 16*a* of video and/or audio signals decoded as above and outputs the signals. FIG. 24B illustrates an example where multimedia data, for example still image data are decoded about an accident on the road (e.g., a vehicle accident, the information of which has been obtained from an RTM message) and the decoded data are displayed on the navigation screen of a vehicle 2411. The screen display of multimedia data associated with road situation as above is carried out according to the user input for particular keys 2421 of the input unit 19 or selectively according to the user preference of the terminal preset by the user. Also, in one embodiment according to the present invention, if location information specified by the TPEG message about road situation associated with the extracted multimedia data, for example link does not belong to the map area of a navigation screen displayed on the LCD panel 16*a* controlled by the controller 15, the location information may not be displayed on the screen.

The controller 15, by displaying 2412 information about road situation contained in the associated TPEG message near or over the display screen along with the decoded multimedia data as description information for the data S2310, enables the user to easily recognize which situation the video or image depicts. For example, if TPEG messages (RTM messages) associated with each other as in FIG. 8 have been received, location of accident vehicles, number of vehicles, accident type, and so on are display together. If an additional information component organized according to the syntax illustrated in FIG. 15 is included in MBT message at the S2310 step, additional information contained in the additional information component is also displayed with the multimedia. Also, if information type component (MBT component of identifier 0x81) organized according to the syntax illustrated in FIGS. 12A through 12D is included within a received MBT message, information extracted from the component, for example type of information with which multimedia data are associated, collector information and/or content description are displayed together with the multimedia data.

The media decoder 20, by referring to execution type information delivered from the controller 15, carries out decoding of the extracted multimedia data once or continuously. If decoding is terminated according to execution type, the controller 15 is notified of the termination.

The controller 15, if termination of decoding is notified from the media decoder 20 or suspension of decoding or removal of decoding screen is requested from the user S2311, checks whether extracted multimedia data is being decoded and if it is found in decoding state, the controller 15 orders the media decoder 20 to stop decoding and removes MBT messages associated with current decoding from TPEG content 15*b* stored in the memory 15*a*, S2312. In another embodiment according to the present invention, the MBT message can be maintained until destruction time without removal. The controller 15 then controls the LCD driver 16*b* and restores the decoding output screen of the LCD panel 16*a* to a map area for the original navigation screen.

The controller 15 carries out the aforementioned operations S2301~S2312 continuously until the user requests service termination.

In another embodiment of the present invention, for the case when cross-reference information is provided for a management container of a TPEG message for a different application service rather than an MBT service, a procedure illustrated in FIG. 23B is carried out instead of the aforementioned S2303 step. To describe a procedure illustrated in FIG. 23B, the controller 15 carries out the aforementioned S2302 procedure, checks whether cross-reference information exists within a TPEG message stored according to the above carrying out S2303-1, if cross-reference information exists, searches the stored TPEG content 15*b* for a TPEG message specified by the cross-reference information S2303-2, and if the searched TPEG message is MBT message, carries out the procedure from the aforementioned S2304 step. If cross-reference information is not recorded within a received TPEG message or a TPEG message specified by cross-reference information is not stored, the cross-reference information is ignored and the aforementioned S2311 step is carried out. In another embodiment according to the present invention, if MBT message specified by recorded cross-reference information does not exist, the cross-reference information is stood by for some prescribed time, for example about three minutes; if MBT message specified by the cross-reference information is not received during the time, the corresponding cross-reference information is ignored.

In what follows, an embodiment is described in detail where information about multimedia data is received through MBT message and actual multimedia data are received through a different signal channel or a different medium. FIG. 25 illustrates a TPEG message sequence carrying traffic-related information including information of MBT service and block diagram of a terminal receiving multimedia data through a different signal channel or a different medium. FIG. 26 illustrates an example of a procedure where multimedia data associated with information carried by a TPEG message are provided for the user, the procedure being carried out by the terminal of FIG. 25 and being described in detail along with the operations of the terminal of FIG. 25.

The terminal of FIG. 25 comprises a tuner 21, a demodulator 22, a TPEG decoder 23, a GPS module 28, a storage means 24, an input device 29, a controller 25, memory 25*a*, an LCD panel 26A, an LCD driver 26B, a media decoder 20, a DMB signal processor 31 receiving, demodulating, and decoding broadcasting signals, for example DMB signals, and a communication module 27 carrying out interfacing with wired or wireless network and communication protocol. Function of each element of the terminal of FIG. 25 has the same function as the corresponding element of the terminal of FIG. 22 with the same name. Also, in what follows, as for the part where the same operation as the corresponding element of the terminal of FIG. 22 is carried out, descriptions of operations of a terminal of FIG. 25 and individual steps of a flow diagram of FIG. 26 are omitted. However, if description of operations of the corresponding element described in the above embodiment cannot consist with or conflict with description of operations of each element additionally described later, it should be understood that operations described below are carried out for the corresponding element. In the flow diagram of FIG. 26, steps where the same procedures as the steps of FIGS. 23A and 23B are carried out used the same numeral reference whereas numeral references not pre-used were used for those steps where different procedures are carried out.

The controller 25, if a transmission medium component 1630, a transfer example of which is illustrated in FIG. 18 is included in an MBT message stored being decoded by the TPEG decoder 23, extracts a signal channel that provides multimedia data or media information from the component S2601. At this moment, as shown in FIG. 18, the extracted information can be information about a DMB channel or URL specifying location information about a particular resource in the Internet, CDMA or GSM communication network.

Also, the controller 25, if an information type component carrying billing information organized according to the syntax illustrated in FIG. 19 is included in the corresponding MET message S2602, extracts the billing information, informs the user of the price for accessing multimedia data provided as a separate channel S2603, and inquires whether to continue of the user. If the use requests 'progress' for the inquiry, the controller 25 accesses the corresponding signal channel or communications network with reference to the information about previously obtained transmission medium.

If transmission medium is, for example DMB (namely, a transmission medium component 1630 includes a DMB component 1810), the controller 25 sets an indicator value according to the acquired frequency information to the tuner 21, additionally outputs resonated DMB signals, and orders the DMB signal processor 31 to process the signals. At this moment, information for specifying an object in the corresponding channel is delivered to the DMB signal processor 31. For example, if a DMB component 1810 is included in a transmission medium component 1630 and transfer type information obtained through the DMB component indicates MOT, a file name extracted from an MOT object link information component 1814*b* is delivered to the DMB signal processor 31 whereas if the transfer type information indicates TDC, SCID value extracted from a TDC object link information component 1814*c* is delivered to the DMB signal processor 31. The DMB signal processor 31 then extracts multimedia data corresponding to the file name specified by the input demodulated signal and delivers the extracted multimedia data to the controller 25 or delivers multimedia data within a service component frame specified by SCID value to the controller 25, S2605.

If transmission medium is a communications network, for example wired or wireless Internet or a mobile communications network such as CDMS or GSM (namely, if Internet component 1820, CDMA component 1830, or GSM component 1840 is included in a transmission medium component 1630), the controller 25 extracts access location information from the corresponding component, for example URL and orders access while delivering the access location information to the communication module 27. According to the order, the communication module 27 carries out a procedure of transferring the received access location information through a wired or wireless communications network according to the required communication protocol, receiving a response from a server having the corresponding multimedia data, and downloading the corresponding multimedia data. During the procedure, when personal information of the user or acceptance or authentication is required, the controller 25 provides a relevant UI, receives required information from the user through the UI, and provides the information for the server through the communication module 27. Through the procedure, multimedia data corresponding to a resource specified by the access location information are downloaded and provided for the controller 25. The multimedia data of specified resource can be provided from the server by streams rather than by downloading.

The controller 25, while delivering multimedia data received from the DMB signal processor 31 or from the communication module 27 to the media decoder 30, orders decoding. At this moment, the controller 25, by providing information decoded from an object information component included in a currently processed MBT message for the media decoder 30 as well, enables the media decoder 30 to decode data properly. The media decoder 30, based on object information, decodes received multimedia data and displays the data S2309.

Although the above embodiments describe only the cases where received multimedia data are with video attribute, the above descriptions can also be applied immediately to audio data. In this case, however, since data from the media decoder 20 or 30 are output through an audio output means (not shown), the user can hear the audio with Video or the audio only.

The terminal of FIG. 25 according to one embodiment of the present invention, as shown in the transfer format of FIG. 20, can be applied not only to the case where multimedia data are provided through MBT message but also to the case where information about a different signal channel or a different medium through which multimedia data are provided is provided through MBT message. In the present embodiment, the terminal of FIG. 25 carries out operations according to the flow diagram illustrated in FIG. 27. Whether operations according to the flow diagram illustrated in FIG. 26 are carried out or operations according to the flow diagram illustrated in FIG. 27 are carried out is determined by a predetermined environment or a program hard-coded in the controller 25.

The controller 25 checks whether multimedia data are included in a decoded MBT message (namely, whether multimedia object data component is included) S2701 and if the data are included, steps of S2308 through S2312 described with reference to FIG. 23A are carried out sequentially (S2312 step is carried out optionally). If the data are not included, whether a signal channel or a media information is included (namely, transmission medium information is included) is checked S2702. If signal channel or media information is included, steps of S2601 through S2605 and S2309 through S2312 described with reference to FIG. 26 are carried out sequentially (S2603, S2604, and S2312 are carried out optionally.)

Meanwhile, a terminal, the organization of which has been illustrated in FIG. 22 or FIG. 25 can for an independent product or can be a constituent unit of a composite product having different functions. For example, FIG. 22 or FIG. 25 can be an independent navigation terminal or part of a mobile phone, PDA, portable multimedia player, or other telematics terminals. When the terminal is used as a constituent unit of a composite product, a procedure according to the flow diagram illustrated in FIG. 23A, 23B, 26, or 27 is carried out upon mode selection of the user.

The foregoing description of a preferred embodiment of the present invention has been presented for purposes of illustration. Thus, those skilled in the art may utilize the invention and various embodiments with improvements, modifications, substitutions, or additions within the spirit and scope of the invention as defined by the following appended claims.

The invention claimed is:

1. A method for processing traffic information, at a server including an encoder and a transmitter, comprising:

encoding, at the encoder, the traffic information including a first service component frame having a first component identifier and a first traffic message, and a second service component frame having a second component identifier and a second traffic message; and transmitting, at the transmitter, the encoded traffic information, wherein the first traffic message including a first message management container, a first event container, and a first location container, wherein the second traffic message including a second message management container, a second event container, a second location container, wherein the second message management container includes a message identifier and a version number, wherein the first traffic message includes a reference information for identifying the second traffic message associated with the first traffic message, wherein the reference information includes the second component identifier, and wherein the traffic information further includes an additional information and language code for the additional information.

2. The method of claim 1, wherein the reference information wherein the reference information further includes a message identifier of the second traffic message and a version number the second traffic message.

3. The method of claim 1, wherein the reference information is included in the first message management container.

4. A method for processing traffic information, at a terminal including a receiver and a decoder, comprising:

receiving, at the receiver, the traffic information including a first service component frame having a first component identifier and a first traffic message, and a second service component frame having a second component identifier and a second traffic message; and decoding, at the decoder, the received traffic information, wherein the first traffic message including a first message management container, a first event container, and a first location container, wherein the second traffic message including a second message management container, a second event container, a second location container, wherein the second message management container includes a message identifier and a version number, wherein the first traffic message includes a reference information for identifying the second traffic message associated with the first traffic message, wherein the reference information includes the second component identifier, and wherein the traffic information further includes an additional information and language code for the additional information.

5. The method of claim 4, wherein the reference information is included in the first message management container.

6. The method of claim 4, wherein the reference information further includes a message identifier of the second traffic message and a version number the second traffic message.

* * * * *